US008876003B2

(12) United States Patent
McKelvey

(10) Patent No.: US 8,876,003 B2
(45) Date of Patent: *Nov. 4, 2014

(54) READ HEAD DEVICE WITH SELECTED OUTPUT JACK CHARACTERISTICS

(75) Inventor: Jim McKelvey, Pensacola, FL (US)

(73) Assignee: Square, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/043,263

(22) Filed: Mar. 8, 2011

(65) Prior Publication Data

US 2012/0095868 A1    Apr. 19, 2012

Related U.S. Application Data

(63) Continuation-in-part of application No. 12/903,753, filed on Oct. 13, 2010, now abandoned, and a (Continued)

(51) Int. Cl.
| | |
|---|---|
| G06K 7/08 | (2006.01) |
| G06K 7/00 | (2006.01) |
| G06Q 30/06 | (2012.01) |
| G06Q 20/34 | (2012.01) |
| G07F 7/08 | (2006.01) |
| G06Q 40/02 | (2012.01) |
| G06Q 20/32 | (2012.01) |

(52) U.S. Cl.
CPC .............. *G06Q 20/322* (2013.01); *G06Q 30/06* (2013.01); *G06Q 20/347* (2013.01); *G06Q 30/0613* (2013.01); *G07F 7/0886* (2013.01); *G06Q 40/02* (2013.01); *G06Q 30/0601* (2013.01)
USPC ............................ 235/449; 235/435; 235/439

(58) Field of Classification Search
CPC ....... G06K 7/087; G06K 7/084; G06K 7/082; G06Q 20/322; G06Q 20/32; G06Q 20/34; G06Q 20/10; G06Q 20/3567; G06Q 20/3226; G06Q 20/204; G06Q 30/00; G07F 7/0886; G07F 7/0873

USPC ......... 235/375, 380–382, 435, 439, 449, 492; 455/556.1, 556.2, 557
See application file for complete search history.

(56) References Cited

U.S. PATENT DOCUMENTS

| | | | |
|---|---|---|---|
| 4,035,614 A | 7/1977 | Frattarola et al. | |
| 4,254,441 A | 3/1981 | Fisher | |

(Continued)

FOREIGN PATENT DOCUMENTS

| | | |
|---|---|---|
| JP | WO01/65827 A2 | 9/2001 |
| JP | 2004078662 A | 3/2004 |

(Continued)

OTHER PUBLICATIONS

"Reading magnetic cards (almost) for free" by Sébastien Bourdeauducq ("Lekernel"), posted on Jan. 26, 2009 at http://lekernel.net/blog/?p=12.

(Continued)

*Primary Examiner* — Steven S Paik
*Assistant Examiner* — April Taylor
(74) *Attorney, Agent, or Firm* — Novak Druce Connolly Bove + Quigg LLP

(57) ABSTRACT

A read head is configured to be coupled to the mobile device. The read head is positioned in a housing. The read head has a slot for swiping a magnetic stripe of a financial transaction card to enable a financial transaction between a buyer and seller. The read head reads data from the magnetic stripe and produces a signal indicative of data stored on the magnetic stripe. The read head includes an output jack adapted to be inserted at least one of the audio jack or microphone input port of the mobile appliance to provide a signal indicative of data stored on the magnetic stripe to, the mobile device. The output jack extends at least 2 mm from the housing.

32 Claims, 21 Drawing Sheets

Related U.S. Application Data continuation-in-part of application No. 12/903,823, filed on Oct. 13, 2010, now Pat. No. 8,534,546, and a continuation-in-part of application No. 12/985,982, filed on Jan. 6, 2011, now Pat. No. 8,573,486, and a continuation-in-part of application No. 13/005,822, filed on Jan. 13, 2011, and a continuation-in-part of application No. 13/010,796, filed on Jan. 21, 2011, now abandoned, and a continuation-in-part of application No. 13/012,495, filed on Jan. 24, 2011, now Pat. No. 8,500,018.

(56) References Cited

U.S. PATENT DOCUMENTS

| | | | |
|---|---|---|---|
| 4,591,937 A * | 5/1986 | Nakarai et al. | 360/101 |
| 4,609,957 A | 9/1986 | Gentet et al. | |
| 4,845,740 A | 7/1989 | Tokuyama et al. | |
| 5,266,789 A | 11/1993 | Anglin et al. | |
| 5,434,400 A | 7/1995 | Scherzer | |
| 5,463,678 A | 10/1995 | Kepley et al. | |
| 5,589,855 A * | 12/1996 | Blumstein et al. | 345/173 |
| 5,603,078 A | 2/1997 | Henderson et al. | |
| 5,679,943 A | 10/1997 | Schultz et al. | |
| 5,729,591 A | 3/1998 | Bailey | |
| 5,764,742 A | 6/1998 | Howard et al. | |
| 5,850,599 A | 12/1998 | Seiderman | |
| 5,878,337 A | 3/1999 | Joao et al. | |
| 5,945,654 A | 8/1999 | Huang | |
| 5,991,749 A | 11/1999 | Morrill, Jr. | |
| 6,006,109 A | 12/1999 | Shin | |
| 6,021,944 A * | 2/2000 | Arakaki | 235/380 |
| 6,032,859 A * | 3/2000 | Muehlberger et al. | 235/449 |
| 6,061,666 A * | 5/2000 | Do et al. | 705/43 |
| 6,129,277 A | 10/2000 | Grant et al. | |
| 6,234,389 B1 | 5/2001 | Valliani et al. | |
| 6,308,227 B1 | 10/2001 | Kumar et al. | |
| 6,363,139 B1 | 3/2002 | Zurek et al. | |
| 6,400,517 B1 | 6/2002 | Murao | |
| 6,431,445 B1 | 8/2002 | DeLand et al. | |
| 6,476,743 B1 | 11/2002 | Brown et al. | |
| 6,481,623 B1 | 11/2002 | Grant et al. | |
| 6,497,368 B1 | 12/2002 | Friend et al. | |
| 6,536,670 B1 | 3/2003 | Postman et al. | |
| 6,579,728 B2 | 6/2003 | Grant et al. | |
| 6,612,488 B2 | 9/2003 | Suzuki | |
| 6,813,608 B1 | 11/2004 | Baranowski | |
| 6,832,721 B2 | 12/2004 | Fujii | |
| 6,850,147 B2 | 2/2005 | Prokoski et al. | |
| 6,868,391 B1 | 3/2005 | Hultgren | |
| 6,896,182 B2 | 5/2005 | Sakaguchi | |
| 6,944,782 B2 | 9/2005 | von Mueller et al. | |
| 7,003,316 B1 | 2/2006 | Elias et al. | |
| 7,013,149 B2 | 3/2006 | Vetro et al. | |
| 7,149,296 B2 | 12/2006 | Brown et al. | |
| 7,163,148 B2 | 1/2007 | Durbin et al. | |
| 7,167,711 B1 | 1/2007 | Dennis | |
| 7,252,232 B2 | 8/2007 | Fernandes et al. | |
| 7,309,012 B2 | 12/2007 | Von Mueller et al. | |
| 7,324,836 B2 | 1/2008 | Steenstra et al. | |
| 7,363,054 B2 | 4/2008 | Elias et al. | |
| 7,409,234 B2 | 8/2008 | Glezerman | |
| 7,433,452 B2 | 10/2008 | Taylor et al. | |
| 7,505,762 B2 | 3/2009 | Onyon et al. | |
| 7,506,812 B2 * | 3/2009 | von Mueller et al. | 235/449 |
| 7,520,430 B1 | 4/2009 | Stewart et al. | |
| 7,581,678 B2 | 9/2009 | Narendra et al. | |
| 7,600,673 B2 * | 10/2009 | Stoutenburg et al. | 235/380 |
| 7,708,189 B1 | 5/2010 | Cipriano | |
| 7,793,834 B2 * | 9/2010 | Hachey et al. | 235/380 |
| 7,810,729 B2 | 10/2010 | Morley, Jr. | |
| 7,869,591 B1 | 1/2011 | Nagel et al. | |
| 7,896,248 B2 | 3/2011 | Morley, Jr. | |
| 7,918,394 B1 | 4/2011 | Morley et al. | |
| 7,945,494 B2 | 5/2011 | Williams | |
| 8,015,070 B2 | 9/2011 | Sinha et al. | |
| 8,231,055 B2 | 7/2012 | Wen | |
| 8,297,507 B2 | 10/2012 | Kayani | |
| 8,376,239 B1 | 2/2013 | Humphrey | |
| 8,413,901 B2 | 4/2013 | Wen | |
| 8,500,010 B1 | 8/2013 | Marcus et al. | |
| 2001/0001856 A1 | 5/2001 | Gould et al. | |
| 2002/0002507 A1 | 1/2002 | Hatakeyama | |
| 2002/0030871 A1 | 3/2002 | Anderson et al. | |
| 2002/0077974 A1 * | 6/2002 | Ortiz | 705/39 |
| 2002/0099648 A1 | 7/2002 | DeVoe et al. | |
| 2002/0108062 A1 | 8/2002 | Nakajima et al. | |
| 2002/0169541 A1 | 11/2002 | Bouve et al. | |
| 2002/0188535 A1 | 12/2002 | Chao et al. | |
| 2003/0089772 A1 | 5/2003 | Chien | |
| 2003/0132300 A1 * | 7/2003 | Dilday et al. | 235/487 |
| 2003/0135463 A1 | 7/2003 | Brown et al. | |
| 2003/0144040 A1 | 7/2003 | Liu | |
| 2004/0012875 A1 | 1/2004 | Wood | |
| 2004/0041911 A1 | 3/2004 | Odagiri et al. | |
| 2004/0058705 A1 | 3/2004 | Morgan et al. | |
| 2004/0087339 A1 | 5/2004 | Goldthwaite et al. | |
| 2004/0093496 A1 | 5/2004 | Colnot | |
| 2004/0104268 A1 | 6/2004 | Bailey | |
| 2004/0127256 A1 | 7/2004 | Goldthwaite et al. | |
| 2004/0128256 A1 * | 7/2004 | Krouse et al. | 705/65 |
| 2004/0204074 A1 | 10/2004 | Desai | |
| 2004/0230489 A1 | 11/2004 | Goldthwaite et al. | |
| 2004/0230526 A1 | 11/2004 | Praisner | |
| 2005/0077870 A1 | 4/2005 | Ha et al. | |
| 2005/0209719 A1 | 9/2005 | Beckert et al. | |
| 2005/0219728 A1 | 10/2005 | Durbin et al. | |
| 2005/0236480 A1 | 10/2005 | Vrotsos et al. | |
| 2005/0242173 A1 * | 11/2005 | Suzuki | 235/380 |
| 2005/0247787 A1 | 11/2005 | Von Mueller et al. | |
| 2006/0049256 A1 | 3/2006 | Von Mueller et al. | |
| 2006/0094481 A1 | 5/2006 | Gullickson | |
| 2006/0122902 A1 | 6/2006 | Petrov et al. | |
| 2006/0142058 A1 | 6/2006 | Elias et al. | |
| 2006/0152276 A1 | 7/2006 | Barksdale | |
| 2006/0208066 A1 | 9/2006 | Finn et al. | |
| 2006/0223580 A1 | 10/2006 | Antonio et al. | |
| 2006/0234771 A1 | 10/2006 | Shavrov | |
| 2006/0273158 A1 | 12/2006 | Suzuki | |
| 2007/0063048 A1 | 3/2007 | Havens et al. | |
| 2007/0067833 A1 | 3/2007 | Colnot | |
| 2007/0100651 A1 | 5/2007 | Ramer et al. | |
| 2007/0124211 A1 | 5/2007 | Smith | |
| 2007/0155430 A1 | 7/2007 | Cheon et al. | |
| 2007/0174080 A1 | 7/2007 | Outwater | |
| 2007/0221728 A1 | 9/2007 | Ferro et al. | |
| 2007/0244811 A1 | 10/2007 | Tumminaro | |
| 2007/0250623 A1 | 10/2007 | Hickey et al. | |
| 2007/0255620 A1 | 11/2007 | Tumminaro et al. | |
| 2007/0255653 A1 | 11/2007 | Tumminaro et al. | |
| 2008/0027815 A1 | 1/2008 | Johnson et al. | |
| 2008/0040265 A1 | 2/2008 | Rackley, III et al. | |
| 2008/0040274 A1 * | 2/2008 | Uzo | 705/44 |
| 2008/0059370 A1 | 3/2008 | Sada et al. | |
| 2008/0059375 A1 | 3/2008 | Abifaker | |
| 2008/0103972 A1 | 5/2008 | Lanc | |
| 2008/0147564 A1 | 6/2008 | Singhal | |
| 2008/0172306 A1 | 7/2008 | Schorr et al. | |
| 2008/0177662 A1 | 7/2008 | Smith et al. | |
| 2008/0208762 A1 | 8/2008 | Arthur et al. | |
| 2008/0238610 A1 | 10/2008 | Rosenberg | |
| 2008/0249939 A1 | 10/2008 | Veenstra | |
| 2008/0275779 A1 | 11/2008 | Lakshminarayanan | |
| 2009/0068982 A1 | 3/2009 | Chen et al. | |
| 2009/0098908 A1 | 4/2009 | Silverbrook et al. | |
| 2009/0100168 A1 | 4/2009 | Harris | |
| 2009/0104920 A1 | 4/2009 | Moon et al. | |
| 2009/0117883 A1 | 5/2009 | Coffing et al. | |
| 2009/0119190 A1 | 5/2009 | Realini | |
| 2009/0125429 A1 | 5/2009 | Takayama | |
| 2009/0144161 A1 | 6/2009 | Fisher | |
| 2009/0159681 A1 | 6/2009 | Mullen et al. | |
| 2009/0166422 A1 * | 7/2009 | Biskupski | 235/449 |
| 2009/0187492 A1 | 7/2009 | Hammad et al. | |

(56) References Cited

U.S. PATENT DOCUMENTS

| | | |
|---|---|---|
| 2010/0052910 A1 | 3/2010 | Mu et al. |
| 2010/0063893 A1 | 3/2010 | Townsend |
| 2010/0108762 A1 | 5/2010 | Morley, Jr. |
| 2010/0184479 A1 | 7/2010 | Griffin |
| 2010/0191653 A1* | 7/2010 | Johnson et al. ............... 705/72 |
| 2010/0222000 A1 | 9/2010 | Sauer et al. |
| 2010/0243732 A1 | 9/2010 | Wallner |
| 2010/0314446 A1 | 12/2010 | Morley, Jr. |
| 2011/0084131 A1 | 4/2011 | McKelvey |
| 2011/0084139 A1 | 4/2011 | McKelvey et al. |
| 2011/0084140 A1 | 4/2011 | Wen |
| 2011/0084147 A1 | 4/2011 | Wilson et al. |
| 2011/0137803 A1 | 6/2011 | Willins |
| 2011/0161235 A1* | 6/2011 | Beenau et al. ............... 705/75 |
| 2011/0174879 A1 | 7/2011 | Morley, Jr. |
| 2011/0180601 A1* | 7/2011 | Morley, Jr. ............... 235/449 |
| 2011/0191196 A1 | 8/2011 | Orr et al. |
| 2011/0198395 A1 | 8/2011 | Chen |
| 2011/0202463 A1* | 8/2011 | Powell ............... 705/44 |
| 2011/0258120 A1 | 10/2011 | Weiss |
| 2011/0259957 A1 | 10/2011 | Tsai |
| 2011/0313880 A1 | 12/2011 | Paul et al. |
| 2012/0008851 A1 | 1/2012 | Pennock et al. |
| 2012/0012653 A1 | 1/2012 | Johnson et al. |
| 2012/0016794 A1 | 1/2012 | Orr et al. |
| 2012/0052910 A1 | 3/2012 | Mu et al. |
| 2012/0234918 A1 | 9/2012 | Lindsay |
| 2012/0246074 A1 | 9/2012 | Annamalai et al. |
| 2013/0087614 A1 | 4/2013 | Limtao et al. |
| 2013/0207481 A1 | 8/2013 | Gobburu et al. |
| 2014/0124576 A1 | 5/2014 | Zhou |

FOREIGN PATENT DOCUMENTS

| | | |
|---|---|---|
| JP | 2005269172 A | 9/2005 |
| WO | 2010/111130 | 9/2010 |
| WO | WO2010097711 A2 | 9/2010 |
| WO | WO2010111130 A2 | 9/2010 |
| WO | WO2010/135174 A1 | 11/2010 |

OTHER PUBLICATIONS

"MSR500EX (Mini123EX) Portable Magnetic Stripe Card Reader" by Tyner ("Tyner"), posted on Apr. 27, 2007 at http://www.tyner.com/magnetic/msr500ex.htm.

"Turning your mobile into a magnetic stripe reader" by Luis Padilla Visdómine ("Padilla I"), dated Aug. 30, 2004.

"Magnetic stripe reader circuit" ("Padilla II") dated Jan. 28, 1997, Luis Padilla Visdómine.

"The simplest magnetic stripe reader", posting from www.gae.ucm.esi~padilla/extrawork/soundtrack.html dated Jan. 27, 2003, Luis Padilla Visdómine.

"Travel industry targeted for Palm PDA card reader" http://www.m-travel.com/news/2001/08/travel_industry.html, dated Aug. 22, 2001.

"Semtek to target healthcare with HandEra PDAs and PDA swipe card reader", http://www.pdacortex.com/semtek.htm, dated Aug. 29, 2001.

"Semtek 3913 Insert Magentic Card Reader 20 Pin Serial RS232" product description, RecycledGoods.com, Apr. 19, 2011.

"Credit Card Swiper and Reader for iPhone, iPad, Blackberry, Android and more", http://hubpages.com/hub/Credit-Card-Swiper-and-Reader-for-iPhone-iPad-Blackberry-An . . . , accessed Apr. 20, 2011.

"ROAMpay is like Square for Blackberry (Plus Android, iOS and Desktops)" by John Paul Titlow, Dec. 1, 2010; http://www.readwriteweb.com/biz/2010/12/roampay-is-like-square-for-bla.php.

"Use a cellphone as a magnetic card reader", Apr. 15, 2005, by Vince Veneziani, http://hackaday.com/2005/04/15/use-a-cellphone-as-a-magnetic-card . . . .

"Merchants eye mobile phones to transact card payments", by Amy E. Buttell, Feb. 3, 2010, http://www.merchantaccountguide.com/merchant-account-news/cell-phone-credit-card-mer . . . .

Online shopping page for "USB Magnetic Stripe Credit/Card Track-2 Reader and Writer (75/210BPI)", Deal Extreme (dealextreme.com), Nov. 15, 2008.

Online shopping page for "Mophie Marketplace Magnetic Strip Reader/Case for iPhone 3G & 3GS—Grey", J&R (JR.com), accessed Feb. 8, 2011.

Online shopping page for "Barcode scanner and Magnetic Stripe Reader (MSR) for Pocke . . . ", Tom's Hardware (tomshardware.com), accessed Feb. 8, 2011.

"A Magnetic Stripe Reader—Read Credit Cards & Driver Licences!", Articlesbase (articlesbase.com), Sep. 7, 2009.

"U.S. Credit Cards to get a high-tech makeover", by Roland Jones, Oct. 22, 2010, http://lifeinc.today.com/_news/2010/10/22/5334208-us-credit-cards-to-get-a-high-tech-mak . . . .

"Arduino magnetic stripe decoder", Instructables, Feb. 8, 2011, http://www.instructables.com/id/Arduino-magnetic-stripe-decoder/.

Online shopping page or "Magnetic Stripe Reader (MSR) MSR7000-100R", Motorola Solutions, accessed Feb. 8, 2011, http://www.motorola.com/business/US-EN/MSR7000-100R_US-EN.do?vgnextoid=164fc3 . . . .

Pay@PC, http://www.merchantanywhere.com/PAY_AT_PCT@PC.htm, accessed Feb. 11, 2011.

"Get paid on the spot from your mobile phone", http://payments.intuit.com/products/basic-payment-solutions/mobile-credit-card-processin . . . , accessed Feb. 11, 2011.

"Touch-Pay Wireless Credit Card Processing", MerchantSeek, http://www.merchantseek.com/wireless-credit-card-processing.htm, accessed Feb. 11, 2011.

"Announcement: Semtek Introduces Side Swipe II Card Reader for Wireless Devices", Brighthand, http://forum.brighthand.com/pdas-handhelds/173285-announcement-semtek-introduces-sid . . . , accessed Apr. 19, 2011.

vTerminal Credit Card Processing App for AuthorizeNet and PayPal Payflow Pro for Curve 8350 8500 8900 and Bold 9000, by Dr. Knox Grandison; https://appworld.blackberry.com/webstore/content/3374, accessed Apr. 20, 2011.

"Magnetic Stripe Card Spoofer" by Adam Harris, Aug. 4, 2008, http://hackaday.com/2008/08/04/magnetic-stripe-card-spoofer/.

Website page snapshot for "Headphone Jack (3.5mm)", http://www.phonescoop.com/glossary/term.php?gid=440, accessed May 5, 2011.

Website page snapshot for "2.5mm Headset Jack", http://www.phonescoop.com/glossary/term.php?gid=360, accessed May 5, 2011.

"Reference Designations for Electrical and Electronics Parts and Equipment, Engineering Drawing and Related Documentation Practices", The American Society of Mechanical Engineers, Nov. 21, 2008.

"Magstripe Interfacing—A Lost Art" by Acidus, http://www.scribd.com/doc/18236182/Magstripe-Interfacing#open_ . . . , accessed Feb. 7, 2011.

"Mag-stripe readers The hunt for a homebrew mag-stripe reader that'll work with modern", posted Jan. 21, 2009, http://www.hak5.org/forums/index.php?showtopic=11563&st=20.

"Hijacking Power and Bandwidth from the Mobile Phone's Audio Interface", Ye-Sheng Kuo, Sonal Verma, Thomas Schmid, and Prabal Dutta, Dec. 17, 2010.

Website: www.alexwinston.com, Aug. 31, 2009.

"Magnetic Card Reader", accessed Apr. 25, 2011, http://lekernel.net/scrapbook/old/cardreader.html.

"Magnetic stripe reader/writer" http://www.gae.ucm.es/~padilla/extrawork/stripe.html, Oct. 29, 1996.

Two-Pass Authenticated Encryption Faster than Generic Composition, S. Lucks, University of Mannheim, Germany; http://th/informatic-uni-mannheim/de/people/lucks/, 2005.

Comparing Block Cipher Modes of Operation on MICAz Sensor Nodes, G. Bauer et al., Institute for Applied Information Processing and Communications, Gran University of Technology, 2009.

* cited by examiner

Track 1 forward

Track 1 reverse

US 8,876,003 B2

READ HEAD DEVICE WITH SELECTED OUTPUT JACK CHARACTERISTICS

CROSS-REFERENCE TO RELATED APPLICATIONS

This application is a continuation-in-part of U.S. Ser. No. 12/903,753, U.S. Ser. No. 12/903,823, both filed Oct. 13, 2010, Ser. No. 12/985,982 filed Jan. 6, 2011 and U.S. Ser. No. 13/005,822 filed Jan. 13, 2011, U.S. Ser. No. 13/010,796, filed Jan. 21, 2011 and U.S. Ser. No. 13/012,495, filed Jan. 24, 2011, all of which applications are incorporated herein by reference.

This application is related to U.S. patent application Ser. No. 12/456,134, filed Jun. 10, 2009, and is hereby incorporated herein by reference.

BACKGROUND OF THE INVENTION

Plastic cards having a magnetic stripe embedded on one side of the card are prevalent in everyday commerce. These cards are used in various transactions such as to pay for purchases by using a credit card, a debit card, or a gasoline charge card. A charge card or a debit card may also be used to transact business with a bank through use of an automated teller machine (ATM). The magnetic stripe card is capable of storing data by modifying the magnetism of magnetic particles embedded in the stripe. The data stored on the magnetic stripe may be sensed or read by swiping the stripe past a read head. The analog waveform obtained by sensing the magnetic stripe must undergo a process known as decoding to obtain the digital information stored in the magnetic stripe of the card.

Currently, there are hundreds of magnetic stripe readers/swipers on the market, all of them are at least as long as the credit card itself. These existing readers/swipers can be classified as either platform card readers or plunge card readers. Platform card readers are traditional card swipers with single rails, which allow a card to be held against the base of the reader by the user and moved across the read head of the reader. Plunge swipers guide a card by two sets of rails and a backstop. Once the user has inserted the card against the backstop, the card is read as it is removed from the plunge swipers. Plunge swipers are common on ATMs and other self-pay devices because they are less prone to hacking.

Magnetic stripe cards having standard specifications can typically be read by point-of-sale devices at a merchant's location. When the card is swiped through an electronic card reader, such as a platform card reader, at the checkout counter at a merchant's store, the reader will usually use its built-in modem to dial the number of a company that handles credit authentication requests. Once the account is verified and an approval signal will be sent back to the merchant to complete a transaction.

Although magnetic stripe cards are universally used by merchants, there is no way for an individual to take advantage of the card to receive a payment from another individual (who is not a merchant) by swiping the card through a simple reader attached to his/her mobile device. For a non-limiting example, one person may owe another person money for a debt, and the conventional way to pay the debt is to provide cash or a check. It would be convenient to be able to use a credit card or a debit card to pay off the debt. In addition, it is advantageous for an individual to make payment to another individual or merchant by swiping his magnetic stripe card through a reader connected to a mobile device.

The foregoing examples of the related art and limitations related therewith are intended to be illustrative and not exclusive. Other limitations of the related art will become apparent upon a reading of the specification and a study of the drawings.

SUMMARY OF THE INVENTION

An object of the present invention is to provide systems and methods for payment by mobile devices.

Another object of the present invention is to provide systems and methods for payment using a portable electronic device, such devices include software, firmware, hardware, or a combination thereof that is capable of at least receiving the signal, decoding if needed, exchanging information with a transaction server to verify the buyer and/or seller's account information, conducting the transaction.

A further object of the present invention is to provide a read head, and its methods of use, that includes a slot, a read head for reading data stored on a magnetic strip of a financial transaction card to produce a signal indicative of data stored on the magnetic stripe, where the signal is decoded to a mobile device coupled to the read head.

These and other objects are achieved in a read head configured to be coupled to the mobile device. The read head is positioned in a housing. The read head has a slot for swiping a magnetic stripe of a financial transaction card to enable a financial transaction between a buyer and seller. The read head reads data from the magnetic stripe and produces a signal indicative of data stored on the magnetic stripe. The read head includes an output jack adapted to be inserted at least one of the audio jack or microphone input port of the mobile appliance to provide a signal indicative of data stored on the magnetic stripe to the mobile device. The output jack extends at least 2 mm from the housing.

In another embodiment of the present invention, a method is provided for conducting a financial transaction with a financial transaction card. A mobile device is coupled to a read head with an output jack of the read head that extends at least 2 mm from a housing associated with the read head. The financial transaction card is swiped through a slot in the read head and the read head reads data from the magnetic strip. A signal is produced indicative of data stored on the magnetic stripe. The signal is sent to the mobile device through the output jack and the signal is decoded at the mobile device.

DETAILED DESCRIPTION OF THE PREFERRED EMBODIMENTS

The approach is illustrated by way of example and not by way of limitation in the figures of the accompanying drawings in which like references indicate similar elements. It should be noted that references to "an" or "one" or "some" embodiment(s) in this disclosure are not necessarily to the same embodiment, and such references mean at least one.

A new approach is proposed that contemplates systems and methods to enable an individual to complete a financial transaction by swiping a magnetic stripe card through a card reader connected to a mobile device. It will be appreciated that the systems and methods of the present invention can be used with financial transactions cards characterized as: (i) allowing a user to choose to pay with reward points or credit, (ii) one that is a credit and a debit card, (iii) having fraud protection built into the card, (iv) having an integrated chip instead of a magnetic strip and the like. In the embodiment of card with an integrated chip, the card has electrical connectors which when fed a current respond with a signal indicative of information stored on the card. A read head is not used with this type of card.

Here, the financial transaction can be any transaction that involves receiving or sending payment from one person to another. The magnetic stripe card can be but is not limited to a credit card, a debit card, or other types of payment authenticating pieces capable of carrying out the financial transaction. The size of the card reader is miniaturized to be portable for connection with the mobile device. The card reader is configured to reliably read data encoded in a magnetic strip of the card with minimum error in a single swipe and provide a signal that corresponds to the data read to the mobile device, which then decodes the incoming signal from the card reader and acts as a point-of-sale device to complete the financial transaction. Such an approach enables a person to become either a micro-merchant (payee) or a buyer/customer (payer) without having to purchase expensive card reader devices or software.

Figure 1:
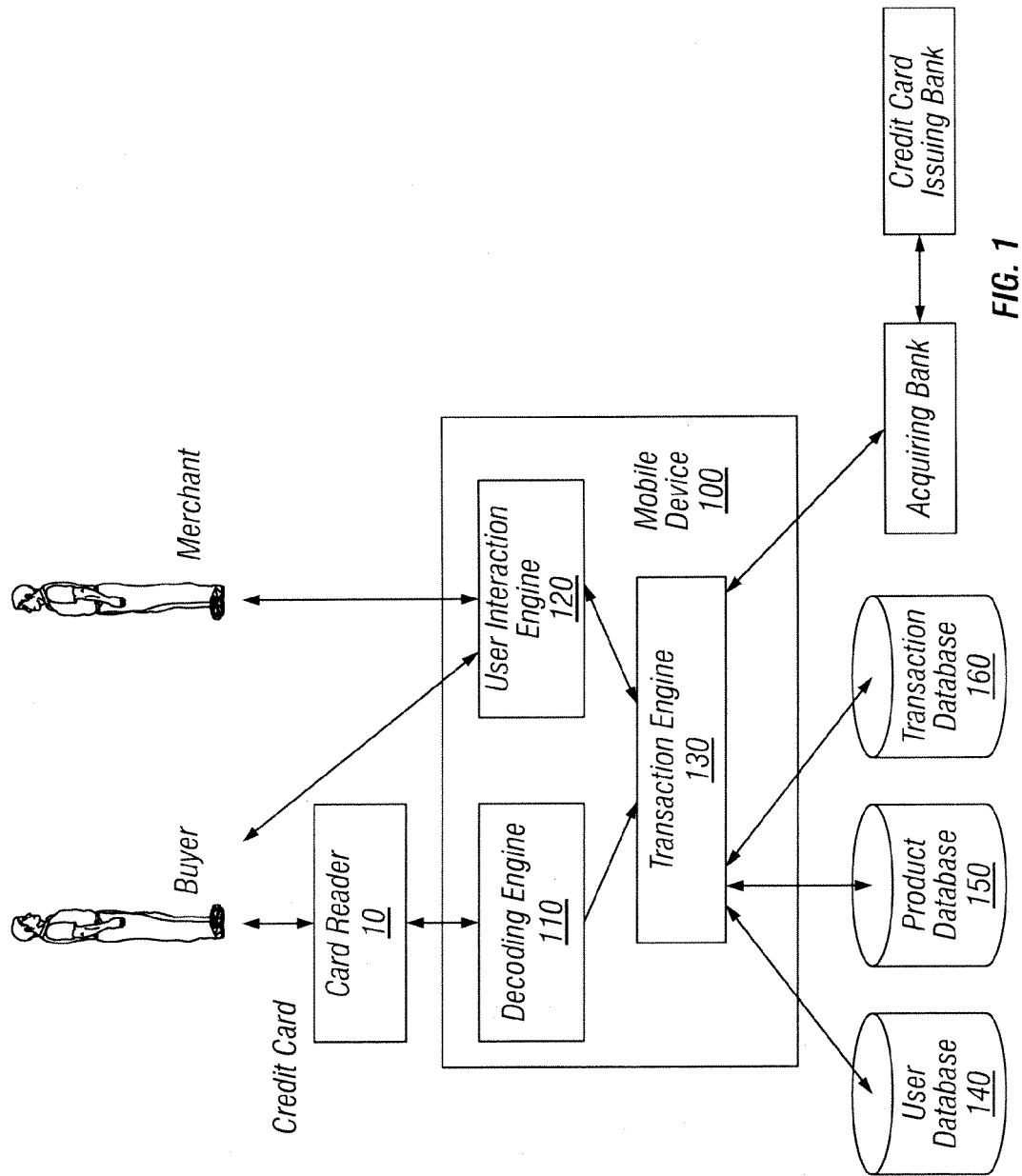
FIG. 1 depicts an example of a system diagram to support financial transaction between a payer and a payee through a miniaturized card reader connected to a mobile device.

FIG. 1 depicts an example of a system diagram to support financial transaction between a payer and a payee through a miniaturized card reader connected to a mobile device. Although the diagrams depict components as functionally separate, such depiction is merely for illustrative purposes. It will be apparent that the components portrayed in this figure can be arbitrarily combined or divided into separate software, firmware and/or hardware components. Furthermore, it will also be apparent that such components, regardless of how they are combined or divided, can execute on the same host or multiple hosts, and wherein multiple hosts can be connected by one or more networks.

In the example of FIG. 1, the system includes a mobile device 100, a miniaturized card reader 10 connected to mobile device 100, a decoding engine 110, a user interaction engine 120, and a transaction engine 130, all running on mobile device 100. Additionally, the system may also include one or more of user database 140, product or service database 150, and transaction database 160, all coupled to the transaction engine 130.

As used herein, the term engine refers to software, firmware, hardware, or other component that is used to effectuate a purpose. The engine will typically include software instructions that are stored in non-volatile memory (also referred to as secondary memory). When the software instructions are executed, at least a subset of the software instructions is loaded into memory (also referred to as primary memory) by a processor. The processor then executes the software instructions in memory. The processor may be a shared processor, a dedicated processor, or a combination of shared or dedicated processors. A typical program will include calls to hardware components (such as I/O devices), which typically requires the execution of drivers. The drivers may or may not be considered part of the engine, but the distinction is not critical.

As used herein, the term database is used broadly to include any known or convenient means for storing data, whether centralized or distributed, relational or otherwise.

In the example of FIG. 1, mobile device 100 to which the portable card reader 10 is connected to can be but is not limited to, a cell phone, such as Apple's iPhone® (mobile digital device), other portable electronic devices, such as Apple's iPod® Touches (mobile digital device), Apple's iPads® (mobile digital devices), and mobile devices based on Google's Android™ operating system, and any other portable electronic device that includes software, firmware, hardware, or a combination thereof that is capable of at least receiving the signal, decoding if needed, exchanging information with a transaction server to verify the buyer and/or seller's account information, conducting the transaction, and generating a receipt. Typical components of mobile device 100 may include but are not limited to persistent memories like flash ROM, random access memory like SRAM, a camera, a battery, LCD driver, a display, a cellular antenna, a speaker, a Bluetooth® circuit, and WIFI circuitry, where the persistent memory may contain programs, applications, and/or an operating system for the mobile device.

Payment confirmation can be made with a communication channel of the buyer's choice. As non-limiting examples, confirmation of payment can be an electronic notification in the form selected from at least one of, email, SMS message, tweet-(message delivered via Twitter® (online social networking service)), instant message, communication within a social network and the like.

In one embodiment of the present invention a system is provided with transaction engine 130 running on mobile device 100. In response to a financial transaction between a buyer and a seller, the mobile device 100 accepts information selected including but not limited to information from financial transaction or information pertaining to financial transaction card used by the buyer in the transaction. Additionally, a financial transaction device can be utilized. Non-limiting examples of financial transaction devices include but are not limited to a, wristband, RFID chip, cell phone, biometric marker and the like. At least a portion of this information is communicated with a third party financial institution or payment network to authorize the transaction. The buyer receives confirmation of the payment. Payment confirmation can be in real time.

Payment confirmation can be made with a communication channel of the buyer's choice. As non-limiting examples, confirmation of payment can be an electronic notification in the form selected from at least one of, email, SMS message, tweet (message delivered via Twitter), instant message, communication within a social network and the like.

In response to the transaction, a confirmation is made that the buyer is authorized to use the financial transaction card in order to prevent fraud. There can also be a confirmation that there are sufficient funds for the purchase made by the buyer.

In one embodiment, it is determined that that the buyer, authorized to use the financial transaction card, is present with the seller at the time of the financial transaction.

Miniaturized Card Reader

In the example of FIG. 1, miniaturized card reader 10 is configured to read data encoded in a magnetic strip of a card being swiped by a buyer and send a signal that corresponds to the data read to mobile device 100 via a signal plug 18. This signal is at least partially if not fully decoded in the mobile device 100.

Figure 2:
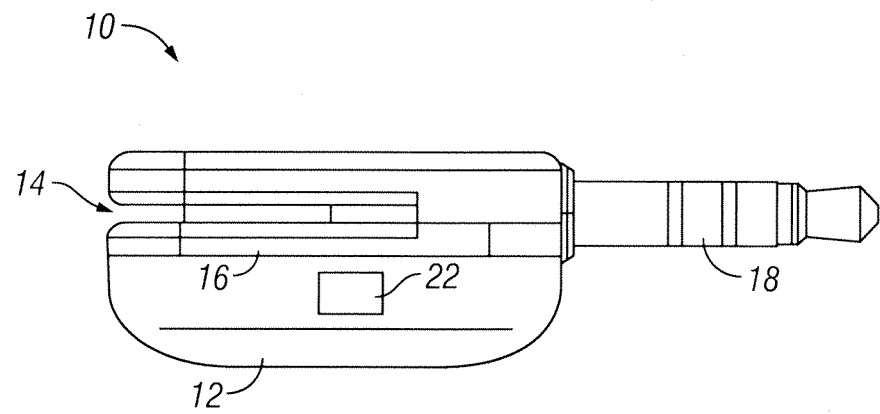
FIG. 2 depicts an example of an external structural diagram of a miniaturized card reader.
Figure 13:
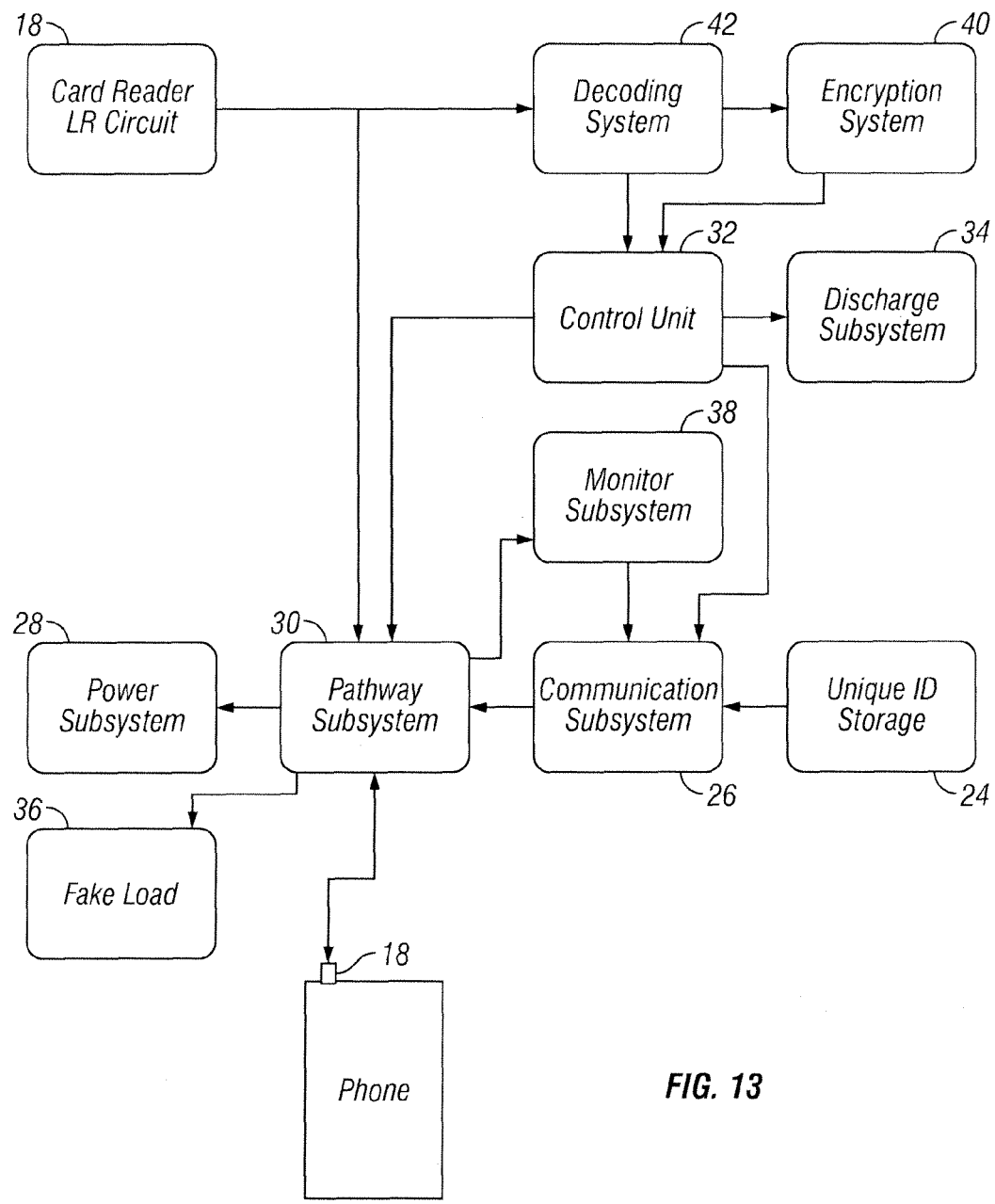
FIG. 13 depicts an example of additional encryption and/or decryption systems included in the passive ID circuitry for encrypting and decrypting of unique ID of card reader.

The size of card reader 10 is miniaturized to be portable for connection with mobile device 100. For a non-limiting example, the size of card reader 10 can be miniaturized to an overall length of less than 1.5". In addition, the miniaturized card reader 10 is also designed to reliably read the card with minimum error via a single swipe by counteracting vendor specific filtering done by mobile device 100. Note that this broad overview is meant to be non-limiting as components to this process are represented in different embodiments. For instance the decoding engine 110 can be embedded in the card reader 10 as shown in FIG. 13 as the decoding system 42. FIG. 2 depicts an example of an external structural diagram of miniaturized card reader 10. Although the diagrams depict components as functionally separate, such depiction is merely for illustrative purposes. It will be apparent that the components portrayed in this figure can be arbitrarily combined or divided into separate software, firmware and/or hardware components.

In the example of FIG. 2, miniaturized card reader 10 is shown to comprise at least a housing 12 having a slot 14, a read head 16 embedded on a wall of slot 14, a signal plug 18 extending out from the housing 12, and an optional passive ID circuit 22.

Figure 3A:
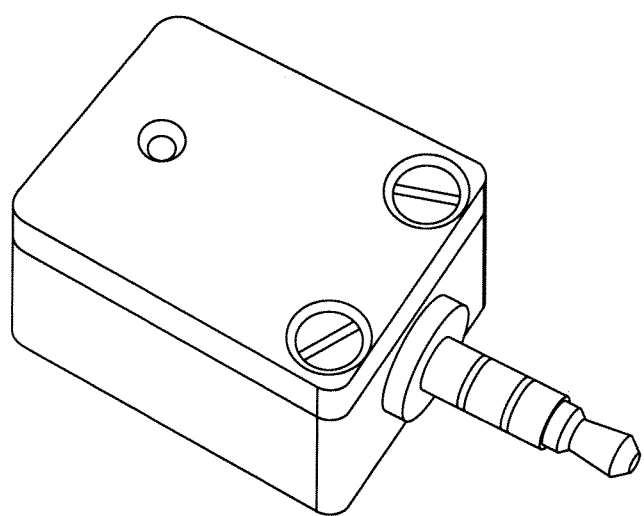
FIGS. 3(a)-(b) depict examples of actual card reader with miniaturized design.
Figure 3B:
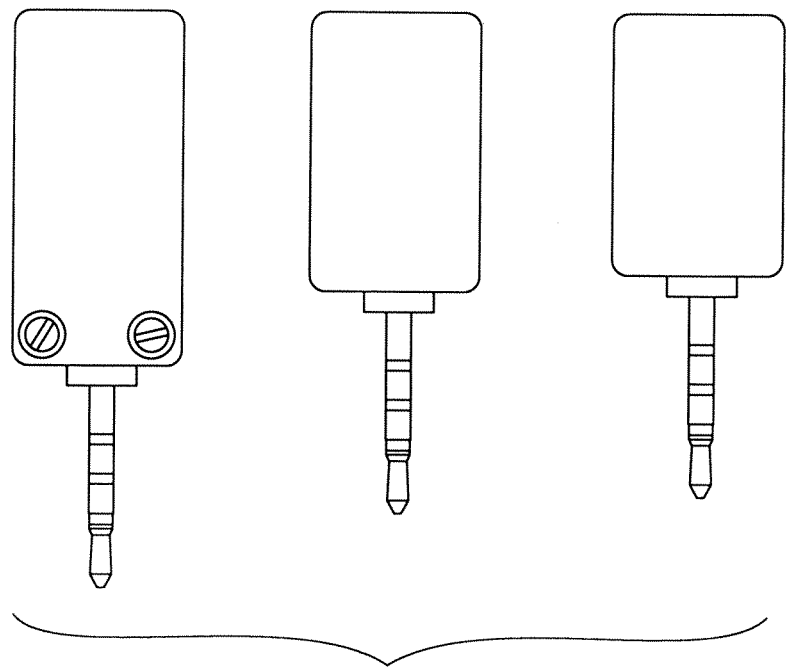

FIG. 3(*a*) depicts an example of an actual card reader with miniaturized design and FIG. 3(*b*) depicts other examples of miniaturized card reader with width around 0.5".

The card reader 10 includes the slot 14 and is miniaturized relative to the size of the mobile device 100. In some embodiments, the housing 12 is not included.

In one embodiment, the slot 14 is configured to maintain contact between the read head 16, and the magnetic stripe of the financial transaction card during a swipe. The signal is decoded in the mobile device 100. The decoding includes determining pulses in the signal and converting at least some of the pulses to characters. In one embodiment, the slot 14 has a width of no greater than 1 mm. The width of the slot 14 is sufficient to enable a successful swiping of the financial transaction card, while producing the signal. It is sized to enable the successful swipe without creating sufficient torque between the signal plug 18 or output jack and the read head 16 or at the mobile device 100 to cause damage due to excessive torque. If the slot 14 is too wide, then it is more difficult to achieve a successful swipe that produce the signal. If there is a miss, or insufficient data is generated, then the resulting signal is not competent. If the slot 14 is too narrow, then the financial transaction card can not be swiped. The size of the slot 14 is selected to reduce torque as discussed above. Additionally, in one embodiment, the output jack 18 is at least partially if not fully rotatable relative to the port it is coupled to in the mobile device 100. The decoding includes error checking. In one embodiment, the decoding includes detecting that data in the signal is from the financial transaction card, seeing the beginning and ending sentinels and reconstructing data in the signal from a pattern of pulses.

In one embodiment of the present invention, the mobile device 100 has an audio input port and a line input port. In one embodiment, a sampling rate of the signal at the audio input port or a line input port of the mobile device is at least 15 kHZ. In various other embodiments, the sample rate of the signal at the audio input port or line import port can be, least 20 kHz; at least 25 kHz, at least 30 kHz, at least 35 kHz or at least 40 kHz.

In one embodiment, the slot 14 is oriented and sized to reduce torque applied on the read head 10 when the financial transaction card is swiped through the slot 14 in order to maintain accuracy and reliability of the data read by the read head 10.

In the example of FIG. 2, housing 12 of card reader 10 is designed to be asymmetrical with respect to slot 14, with texture such as logo on one side of the housing that can be felt and recognized by a user with a touch of a finger. For correct swiping of the card, the texture side of housing 12 should match with the texture (front) side of the card, so that a user can easily identify the right side of the reader to swipe the card through slot 14 without actually looking at the reader or card. Even a blind person is able to swipe the card correctly by matching the texture side of the reader with the texture side of the card.

In the example of FIG. 2, the slot 14 is wide enough and deep enough to accept a card having a magnetic stripe so that the stripe will fit within the slot 14. More importantly, the slot 14 is configured to reduce the torque applied on the reader 10 when the card is swiped through slot 14 in order to maintain accuracy and reliability of the data read by read head 16. Since the size of card reader 10 is miniaturized, slot 14 also has a length that is significantly less than the length of the card to be inserted into the slot 14.

Figure 4A:
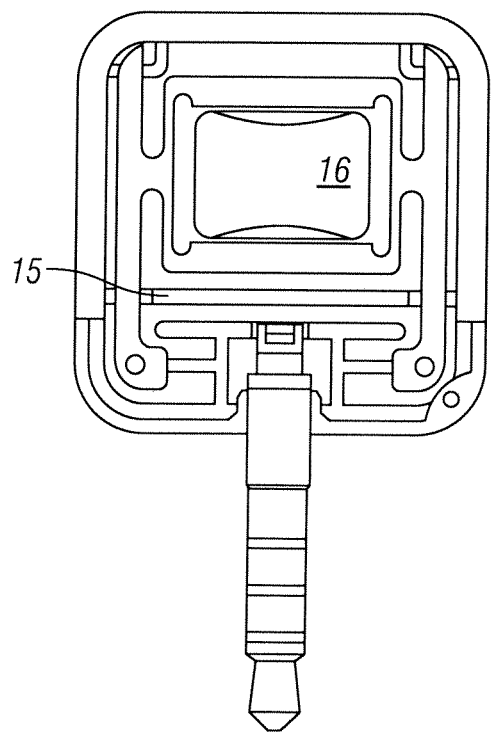
FIGS. 4(a)-(b) depict examples of alignment between read head of the card reader and magnetic stripe of card being swiped.

To correctly read the data on the magnetic stripe of the card, the read head 16 must maintain contact with the stripe as the card moves past slot 14. If the card rocks during the swipe, the alignment of the head 12 with the stripe may be compromised. As the length of the slot 14, i.e., the card path through which the card swiped though slot 14, is shortened, rocking and head alignment may become significant issues. As shown in FIG. 4(*a*), if the magnetic stripe card is swiped through without the base of the card resting against the flat bottom piece, the magnetic stripe will not align with the read head 16 when the card is swiped through slot 14 having a flat base 15.

Figure 4B:
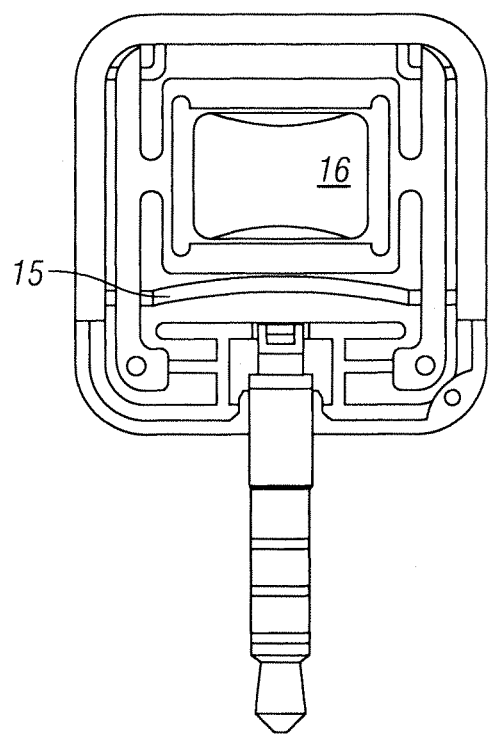

In some embodiments, the base 15 of slot 14 can be changed from flat to a curved base with a radius in order to increase contact between the read head 16 and the magnetic stripe to address the rocking problem. As shown in FIG. 4(b), the read head 16 can maintain contact with the magnetic stripe, even with some additional error due to the gradation of contact introduced by the curved base 15.

Figure 5:
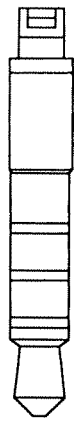
FIG. 5 depicts an example of a TRS connector as a part of card reader.

FIG. 5 depicts an example of signal plug 18 as part of card reader 10. Here, signal plug 18 can be but is not limited to a TRS (tip, ring, sleeve) connector also known as an audio plug, phone plug, plug plug, stereo plug, mini-plug, or a mini-stereo audio connector. The signal plug 18 may be formed of different sizes such as miniaturized versions that are 3.5 mm or 2.5 mm.

In some embodiments, signal plug 18 may be retractable within the housing 12. In some embodiments, signal plug 18 is configured to extend beyond housing 12 of the reader in order to accommodate connection with mobile devices 100 having cases or having a recessed plug-in socket, wherein the socket can be but is not limited to a microphone input socket or a line in audio input of the mobile device.

In some embodiments, housing 12 of card reader 10 is made of non-conductive material such as plastic so that the reader will not interfere with the function of mobile device 100 it is connected with. Such choice of material is important since the outer case of certain mobile devices, such as iPhone4®, is conductive and serves as an antenna for the device, which function could potentially be interfered with if the metal case of the device gets in touch with the housing of a card reader made of conductive material.

Figure 6A:
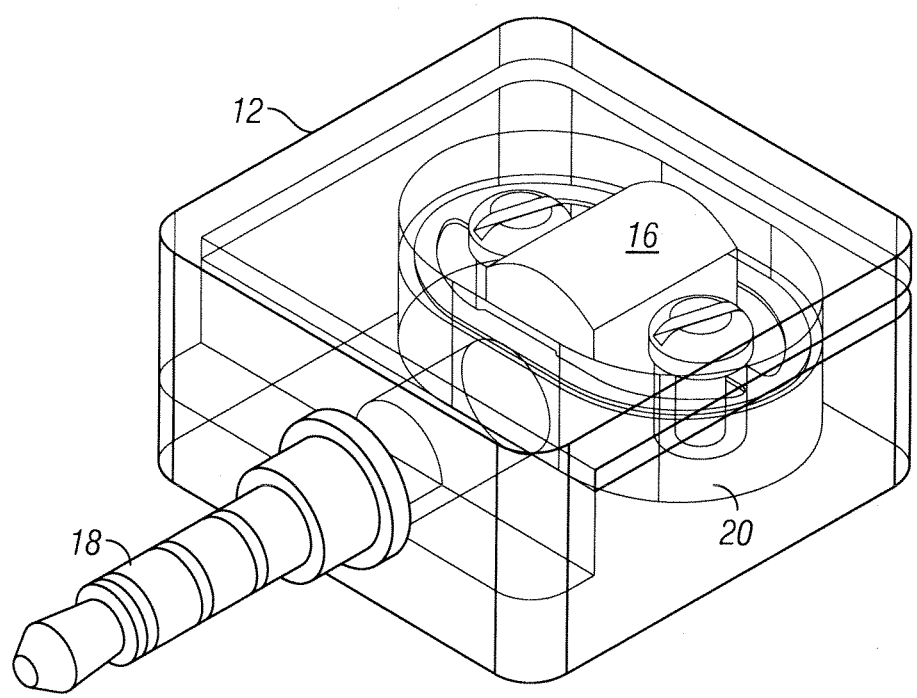
FIGS. 6(a)-(c) depict examples of internal structures of a miniaturized card reader.

FIG. 6(a) depicts an example of an internal structural diagram of a miniaturized card reader. Although the diagrams depict components as functionally separate, such depiction is merely for illustrative purposes. It will be apparent that the components portrayed in this figure can be arbitrarily combined or divided into separate software, firmware and/or hardware components.

Figure 6B:
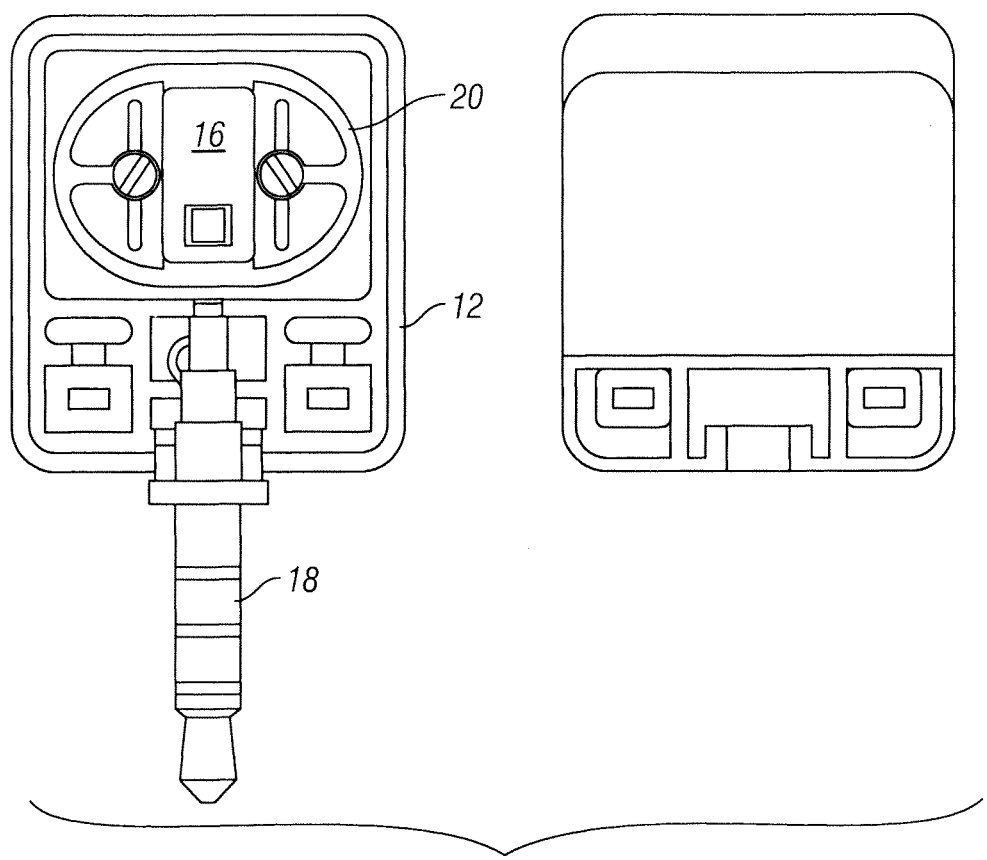
Figure 6C:
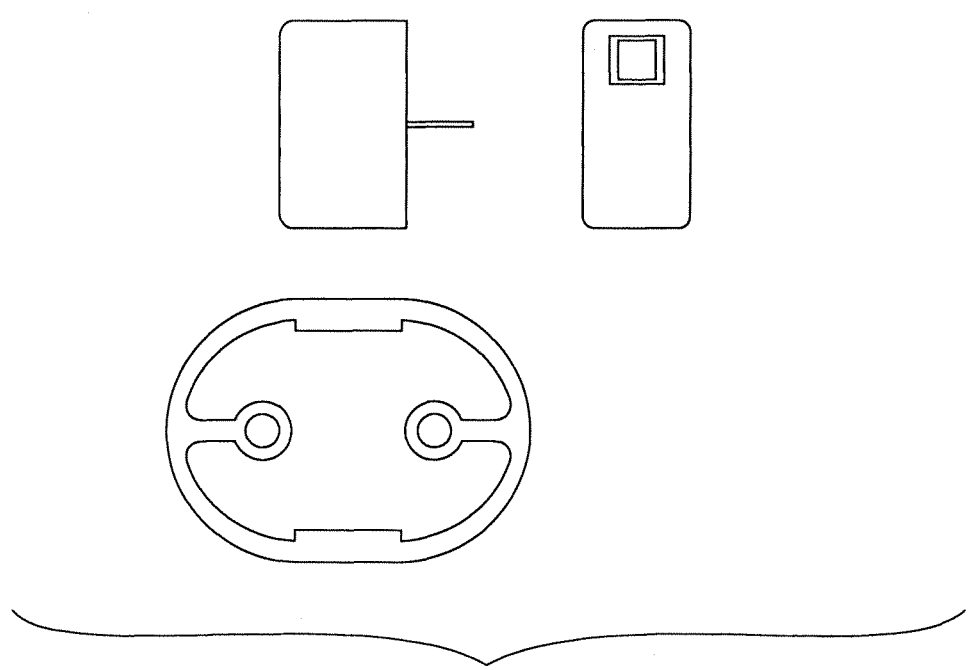

In the example of FIG. 6(a), the internal structure inside housing 12 of card reader 10 is shown to comprise at least a read head 16 with embedded circuitry, and a spring structure 20 to support read head 16. FIG. 6(b) depicts an example of an internal structure an actual miniaturized card reader. FIG. 6(c) depicts an example of separated components of read head 16 and spring structure 20 used in the actual miniaturized card reader.

In the example of FIGS. 6(a)-(c), read head 16, which for a non-limiting example, can be an inductive pickup head, detects and provides data stored in the magnetic stripe of a card to a connected mobile device 100. More specifically, as the magnetic stripe of a card is swiped through slot 14 and in contact with read head 16, the card reader device 10 reads one or more tracks of data or information stored in the magnetic stripe of the card via the detection circuitry embedded inside the read head. Here, data stored in the magnetic stripe may be in the form of magnetic transitions as described in the ISO 7811 standards. As the card moves past the read head 16, magnetic transitions representing data induce a voltage or waveform in a coil (not shown) of read head 16 due to such relative movement between read head 16 and the stripe (called the Hall Effect), wherein a resistor (not shown) inside read head 16 sets the amplitude of the waveform. This waveform is sent via the signal plug 18 into the socket which is registered by the microphone of the mobile device 100 connected with card reader 10.

Figure 7A:
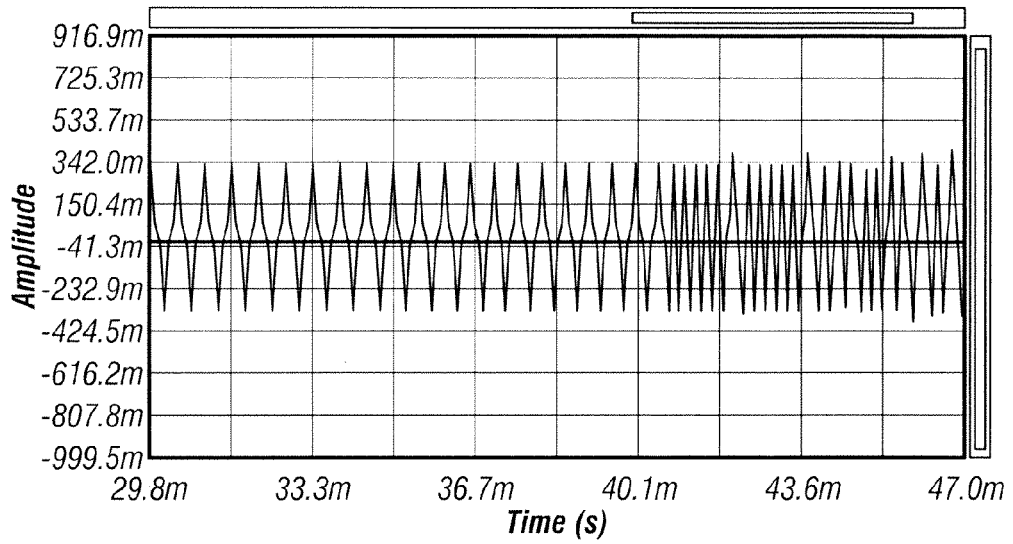
FIGS. 7(a)-(b) depict examples of waveforms of data read from one track of the magnetic stripe by read head when the card is swiped through the slot of the card reader in the forward and reverse directions, respectively.
Figure 7B:
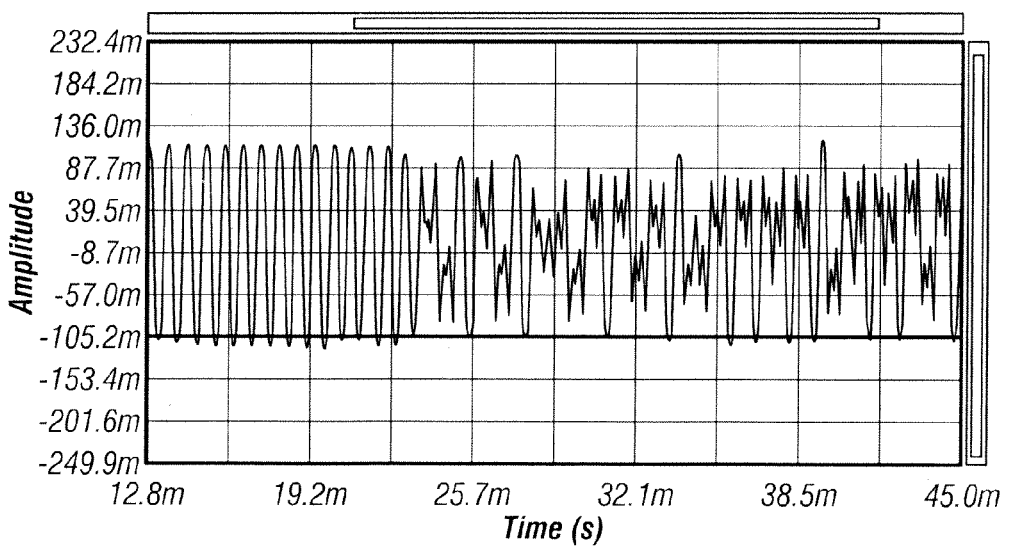

In some embodiments, read head 16 in card reader is capable of reading only one track of data (either track 1 or 2, but not both) from the magnetic stripe in order to reduce the size and structural complexity of compact read head 16 as only one pin needs to be included in the read head. FIGS. 7(a)-(b) depict examples of waveforms of data read from track 1 (instead of both tracks 1 and 2 as by a traditional read head) of the magnetic stripe by read head 16 when the card is swiped through slot 14 in the forward and reverse directions, respectively.

In some embodiments, the size or thickness of the housing 12 of card reader 10 is configured to be narrow enough to accommodate only a single read head 16. Such design is intended to be tampering-proof so that even if the housing 12 is tampered with, no additional circuitry can be added to the card reader 10 and such tampering will render the card reader non-functional.

In the example of FIGS. 6(a)-(c), spring structure 20 is a flexible spring mounting to read head 16 without a screw, causing the read head to be suspended to housing 12 of card reader 10. Here, spring 20 can either be connected to housing 12 via screws or welded to plastic housing 12 without using any screws. As the card moves past the read-head 16 on the miniaturized card reader, any card bending or misalignment may cause the read head to lose contact with the magnetic stripe. Spring 20 allows suspended read head 16 to swivel while maintaining contact pressure to track the stripe of the card being swiped. Spring 20 is designed to be sufficiently small to fit within the miniaturized card reader 10, yet powerful enough to maintain good contact during the stripe. Unlike traditional spring structures, spring 20 positions the supports for read head 20 inside the overall form of the spring, which allows the spring to flex without having to make one support moveable.

Figure 8:
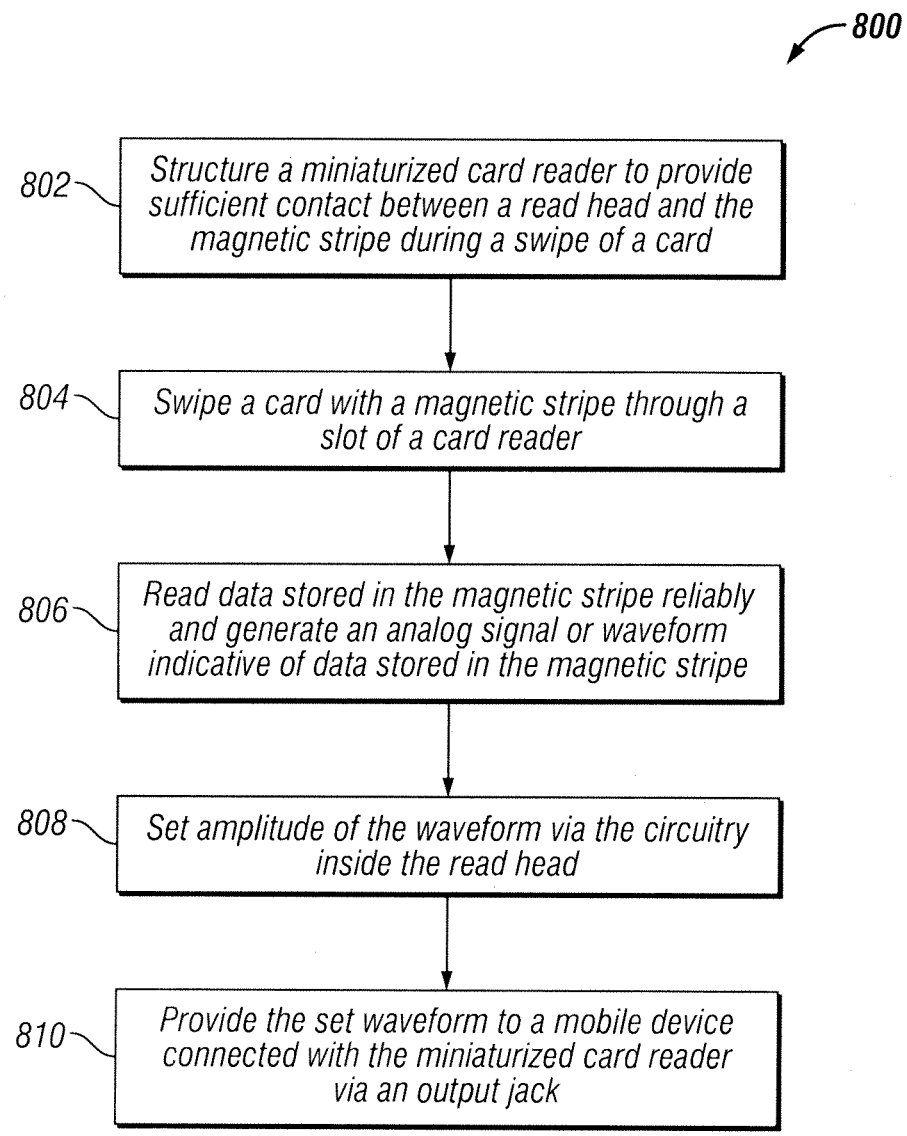
FIG. 8 depicts a flowchart of an example of a process to support swiping of a card with a magnetic stripe through a miniaturized portable card reader.

FIG. 8 depicts a flowchart of an example of a process to support swiping of a card with a magnetic stripe through a miniaturized portable card reader. Although this figure depicts functional steps in a particular order for purposes of illustration, the process is not limited to any particular order or arrangement of steps. One skilled in the relevant art will appreciate that the various steps portrayed in this figure could be omitted, rearranged, combined and/or adapted in various ways.

In the example of FIG. 8, the flowchart 800 starts at block 802 where a miniaturized card reader is structured to provide sufficient contact between a read head and the magnetic stripe during a swipe of a card. The flowchart 800 continues to block 804 where a card with a magnetic stripe is swiped through a slot of the miniaturized card reader. The flowchart 800 continues to block 806 where the read head reliably reads data stored in the magnetic stripe and generates an analog signal or waveform indicative of data stored in the magnetic stripe. The flowchart 800 continues to block 808 where amplitude of the waveform is set by the circuitry inside the read head. The flowchart 800 ends at block 810 where the set waveform is provided to a mobile device 100 connected with the miniaturized card reader via the signal plug 18.

Passive ID Circuit

In some embodiments, housing 12 of card reader 10 may further encapsulate a passive ID circuitry 22 powered by the mobile device 100 through signal plug 18, wherein passive ID circuitry 22 delivers an unique ID of the card reader to mobile device 100 only once upon the card reader being connected to (and powered up by) the mobile device. Although both are integrated in the same housing 12, passive ID circuitry 22 functions independently and separately from read head 18 without interfering with the read head's card swiping functions described above.

Figure 9:
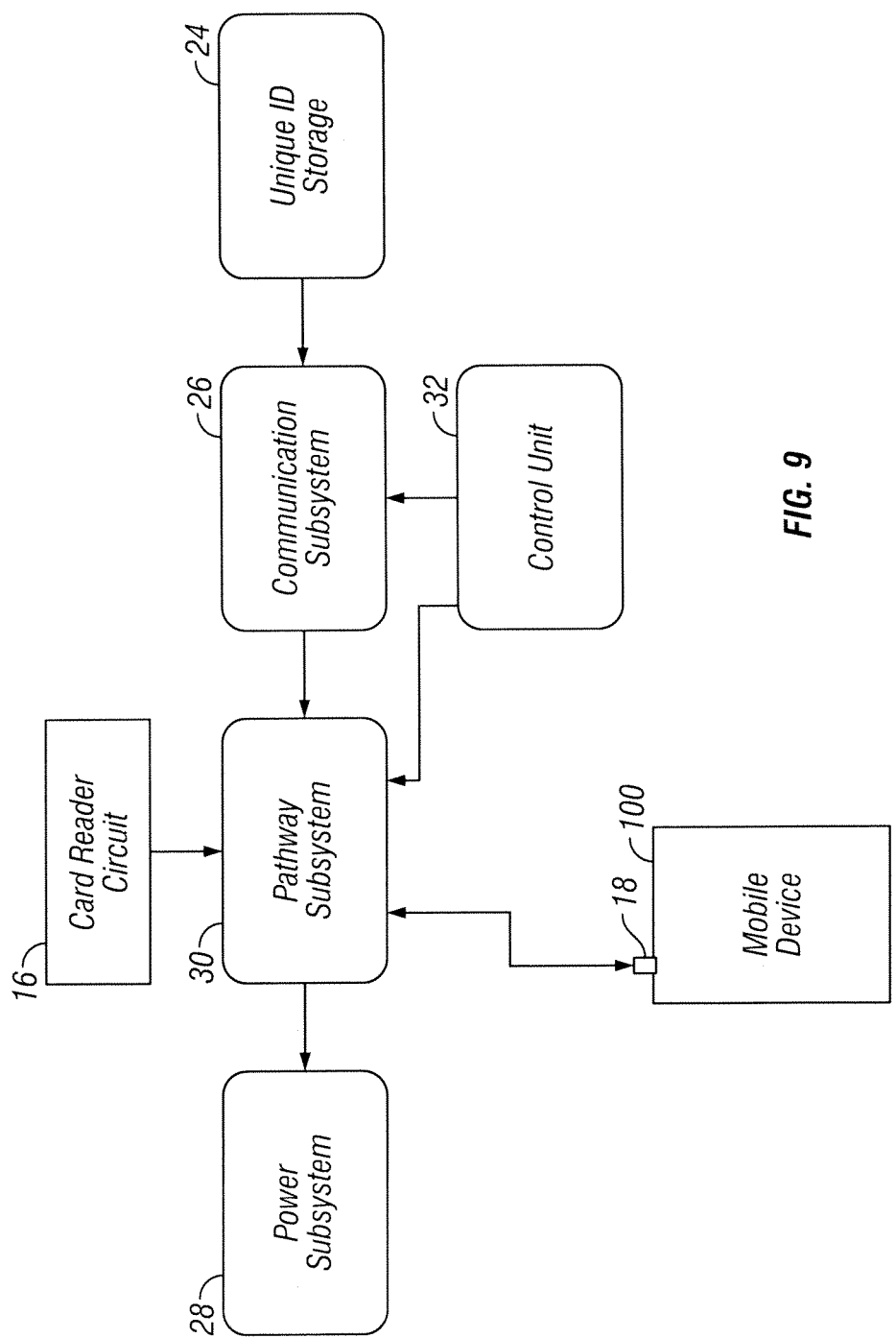
FIG. 9 depicts an example of schematic diagram of passive ID circuitry embedded in the card reader.

FIG. 9 depicts an example of schematic diagram of passive ID circuitry embedded in the card reader. In the example of FIG. 9, passive ID circuitry 22 may comprise at least five main subsystem/components: unique ID storage 24, communication subsystem 26, which reads and transmits the unique ID from unique ID storage 24, power subsystem 28, which provides power to enable communication with mobile device 100, a pathway subsystem 30 to route signals to signal plug 18 through the circuitry, and a control unit 32, to orchestrate the communication between different systems. All of these subsystems can be implemented in hardware, software or a combination thereof. Communication subsystem 26, power subsystem 28, and read head 16 share the same signal plug 18 for connection with the mobile device. The components portrayed in this figure can be arbitrarily combined or divided into separate software, firmware and/or hardware components.

In the example of FIG. 9, unique ID storage 24 is memory containing the Unique ID of the card reader. The unique ID storage 24 can be any persistent memory containing bytes that can be accessed by the communication subsystem 26.

Figure 10:
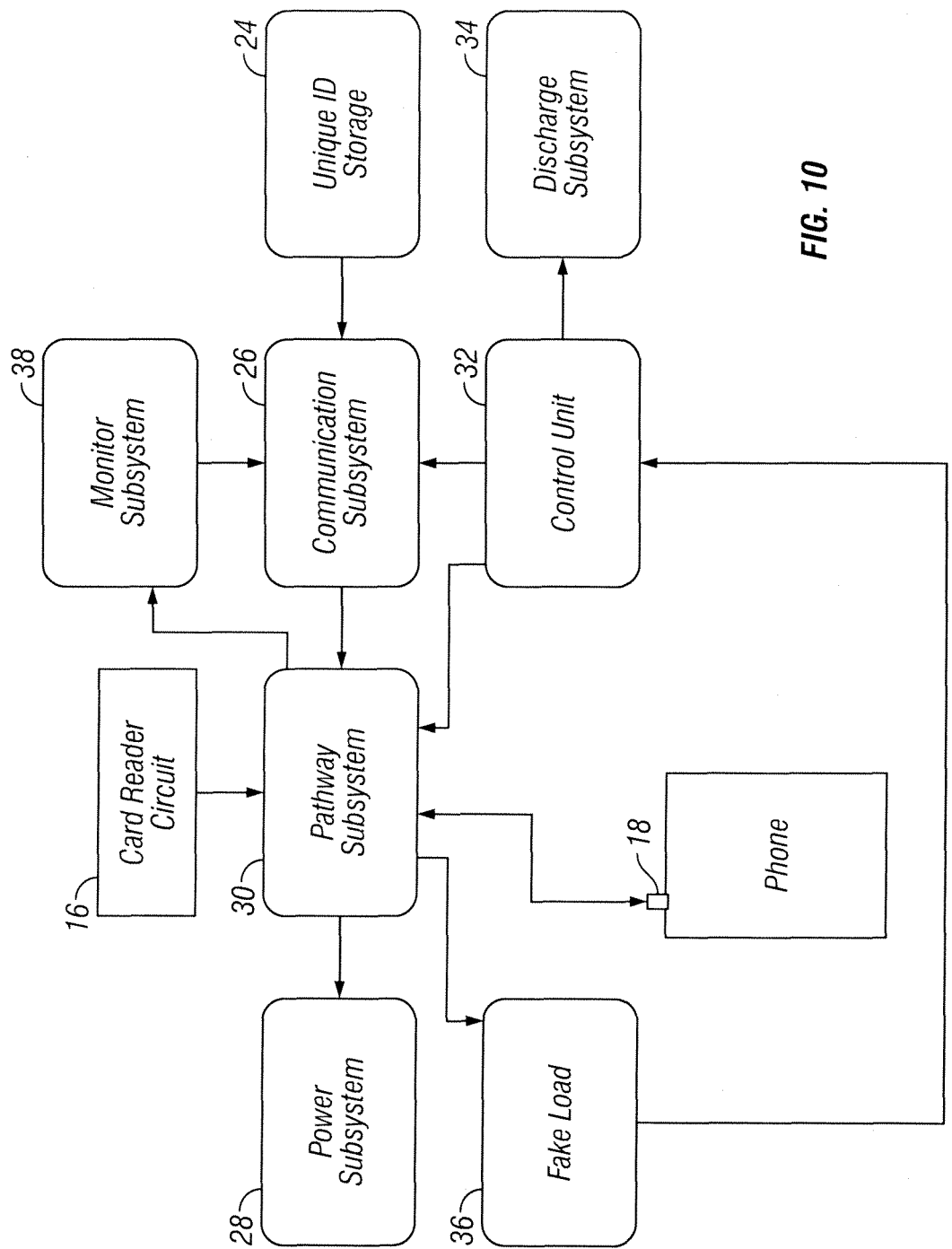
FIG. 10 depicts an example of schematic diagram that contains additional components of passive ID circuitry 22 that contribute to the user experience.

In the example of FIG. 9, the power subsystem 28 comprises of a modified charge pump, which utilizes a digital circuit to artificially raise the voltage of a power source to a higher level. Normal charge pump operation requires large current which is then fed into several capacitors, and switching logic switches the capacitors between series and parallel configurations. In the example of FIG. 10, the power source is a bias voltage provided by the mobile device meant for detection of a connected component. It is nominally 1.5V and is supplied through a 2 kΩ resistor, resulting in a maximum current of 750 μA. Details of how the power subsystem 28 function is described in FIG. 11.

In standard operation the pathway subsystem 30 is configured to direct the mobile device's 100 bias voltage to the power subsystem 28. After the power subsystem converts the bias voltage to a system voltage, the control unit 32 is able to operate. Control unit 32 configures the pathway subsystem 30 to allow the communication subsystem 26 access to the mobile device 100. The communication subsystem 26 relays the unique ID from the unique ID storage 24. The control unit 32 then configures the pathway subsystem 30 to allow the card reader circuit 16 access to the mobile device 100.

FIG. 10 depicts an example of schematic diagram that contains additional components of passive ID circuitry 22 that contribute to the user experience. These additional systems prevent the mobile device 100 from perceiving that the card reader 10 has been disconnected during power cycles. These additional systems also ensure that the unique ID sent from unique ID storage 24 is sent as specified by the designer. This extra feature set comprises of a discharge subsystem 34 to force the device to power cycle, a fake load 36 so the mobile device 100 does not perceive a disconnect, and a monitor system 38 to manage card reader 10 behavior between power cycles.

Figure 12:
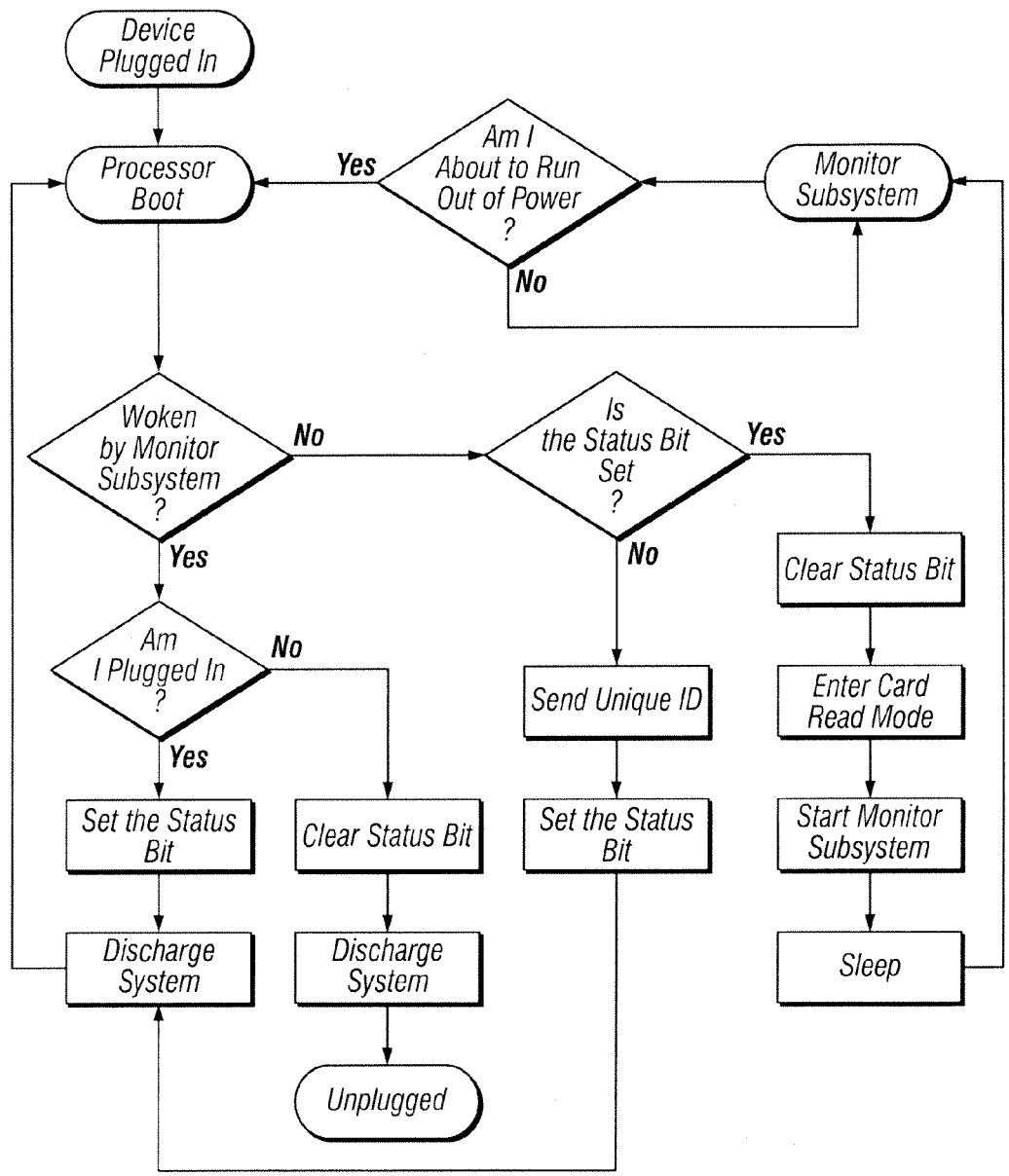
FIG. 12 depicts a flowchart of an example of a process to deliver the unique ID to mobile device via the passive ID circuitry.

In the example of FIG. 10, communication subsystem 26 comprises a signal driver connected with control unit 32 and unique ID storage 24. In a non-limiting embodiment of a system which sends an ID only once to a mobile device 100, after the control unit 32 boots up, communication subsystem 26 will check a status bit in the monitor subsystem 38. The first time this process occurs, the status bit will be not set. When the status bit is not set the ID is sent immediately. FIG. 12 contains a detailed flowchart of a non-limiting example of this process. In one embodiment the control unit 32 will write to the status bit in monitor subsystem 38. It will then use the discharge system 34 to reset itself. During this time the pathway subsystem 30 will be configured to direct the signal path to the fake load preventing the mobile device 100 from detecting a disconnect with the card reader 10. Once the power subsystem 28 has completed its power cycle, the control unit 32 will read the status bit. Upon seeing that the status bit is cleared it will configure the pathway subsystem 30 to direct the signal path to the card reader circuit 16. The control unit 32 will then put the system into an extremely low power state (from here referred to as a sleep state). Only the monitoring subsystem 38 will remain active. The monitor subsystem 38 will wake the system from the sleep state at some time (time depending on implementation) before a power cycle. The control unit 32 will notified of the system awakening by the monitoring subsystem 38. The control unit 32 will then set the status bit on the monitor subsystem 38 only if there is a voltage detected on the fake load indicating the reader is still connected. The control unit 32 will then force a power cycle.

Figure 11:
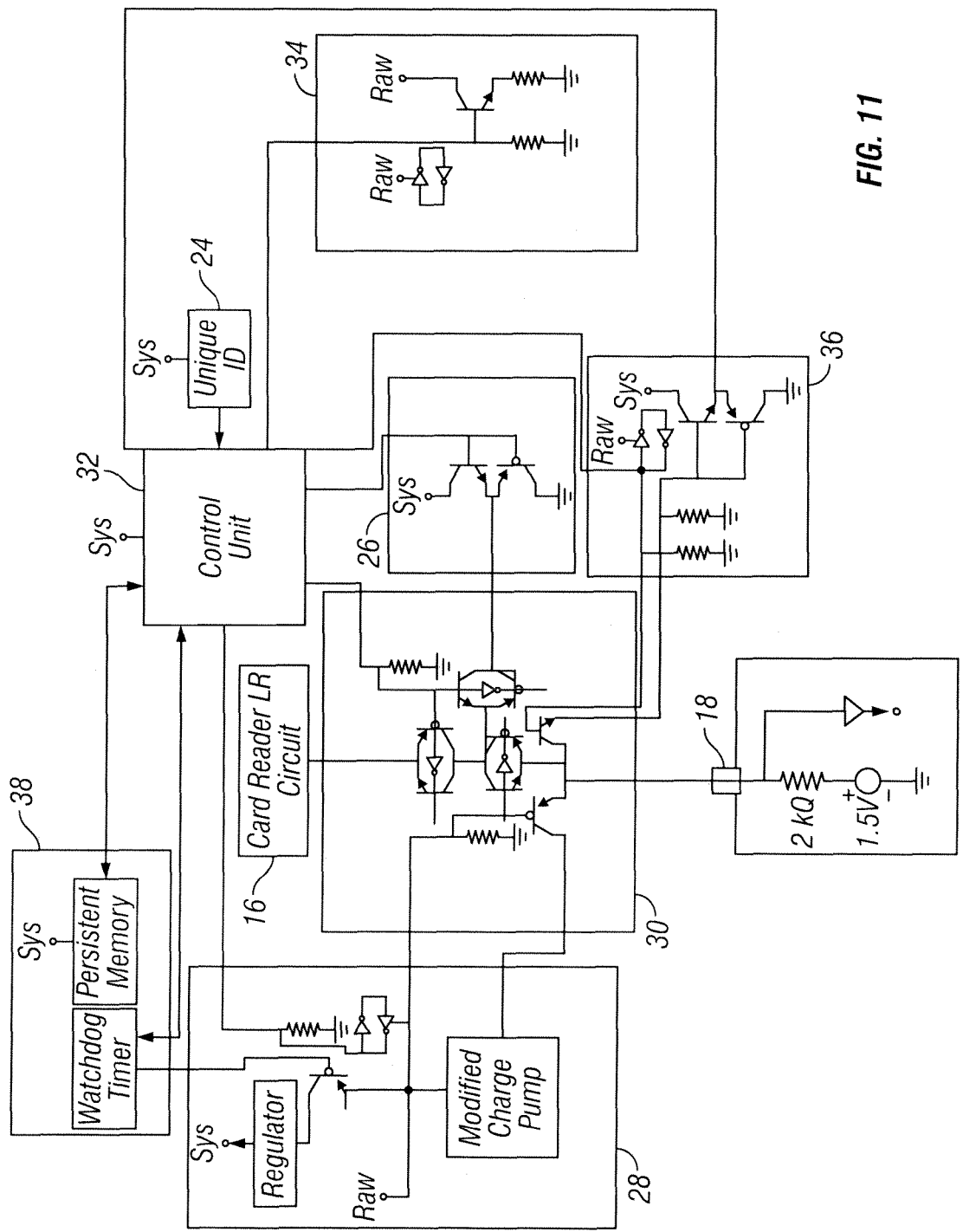
FIG. 11 depicts an example of an implementation for passive ID circuitry 22 depicted in FIG. 10.

FIG. 11 depicts an example of an implementation for passive ID circuitry 22 depicted in FIG. 10. In some embodiments, power subsystem 28 has multiple capacitors in parallel. A voltage breaker (e.g., zener diode etc) and a latch are used to trigger the transition between parallel and series configurations. Once the latch is flipped, power subsystem 28 will remain in series configuration until the combined voltage drops bellow the CMOS trigger gate voltage at about 0.4V. At this time the passive ID circuitry 22 will reset and the unique ID delivery process will begin again In the example of FIG. 11, pathway subsystem 30 comprises a plurality of latches controlled by control unit 32 for switching among various subsystems of passive ID circuitry 22. When passive ID circuitry 22 is in operation, the default configuration allocates the output signal through signal plug 18 to modified charge pump of power subsystem 28. After the latch to turn off modified charge pump 28 is triggered, control unit 32 will route signal plug 18 from read head 16 to communication subsystem 26 and transmit the unique ID through signal plug 18 after checking the status bit in unique ID storage 24. Pathway subsystem 30 will then write to the status bit in unique ID storage 24 and discharge the power subsystem 28. FIG. 12 depicts a flowchart of an example of a process to deliver the unique ID to mobile device 100 via the passive ID circuitry 22.

In some embodiments, passive ID circuitry 22 may further include additional encryption and/or decryption systems as shown in FIG. 13 for encrypting and decrypting of unique ID of card reader 10. In the example of FIG. 13, the decoding system 42 and encryption system 40 can both use the control unit 32 from the passive ID circuitry 22 to communicate with the mobile device 100 over the communication subsystem 26.

Signal Decoding

Figure 14:
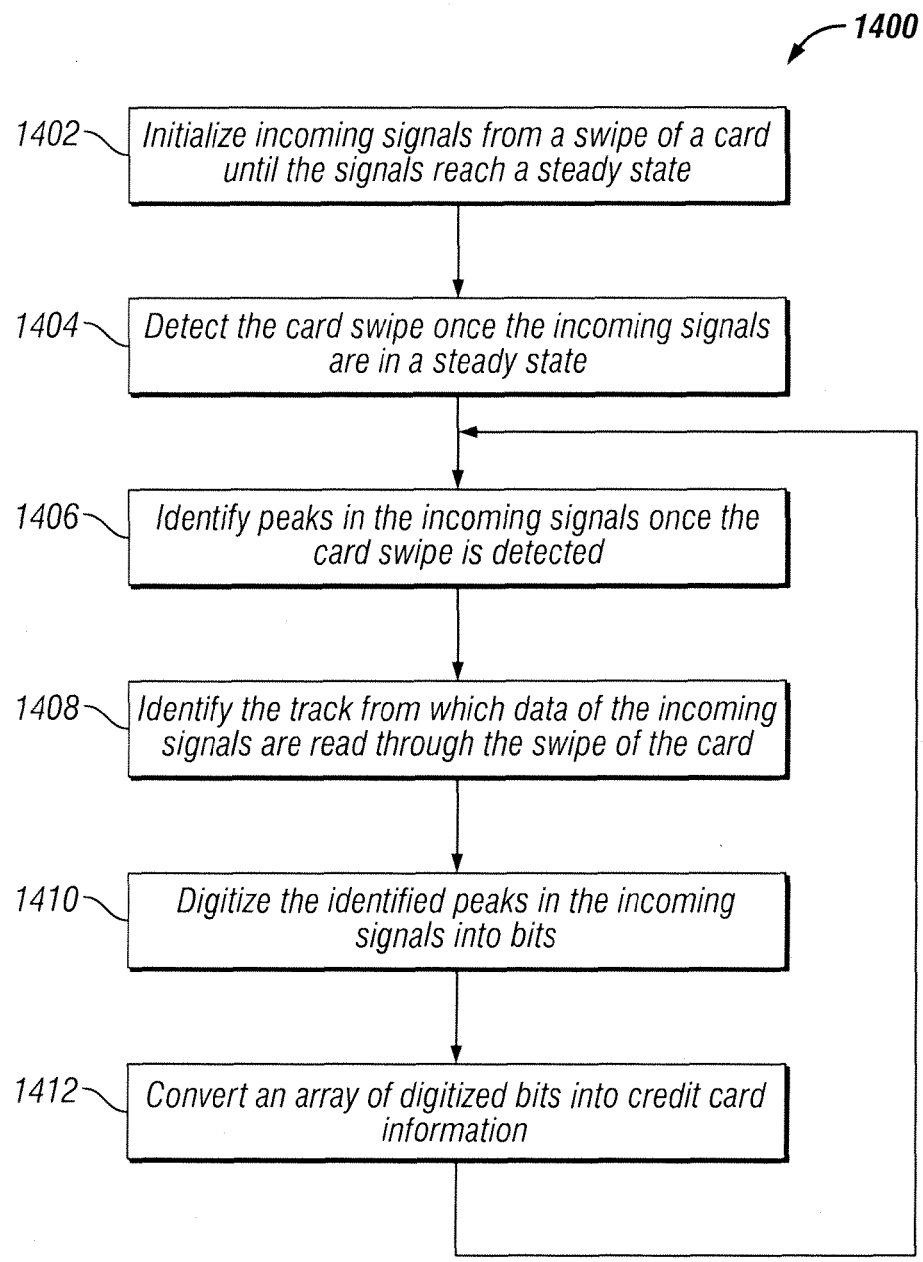
FIG. 14 depicts a flowchart of an example of a process to support decoding of incoming signals from swiping of a card with a magnetic stripe through a miniaturized portable card reader.

Once card reader 10 provides the set waveform to the attached mobile device 100, the incoming signals (waveform) may be amplified, sampled, and converted to a stream of digital values or samples by decoding engine 110 running via a microprocessor inside the mobile device. Here, decoding engine 110 may comprise a pipeline of software decoding processes (decoders) to decode and process the incoming signals as described below, where each software process in this pipeline can be swapped out and replaced to accommodate various densities of track data read in order to reduce card swipe error rate. The incoming signals may be of low quality due to one or more of: low quality of data read from a single and/or low density track of a magnetic stripe of the card, sampling speed limitations of the microphone input socket of the mobile device, and noise introduced into the mobile device 100 from card reader 10. FIG. 14 depicts a flowchart of an example of a process to support decoding of incoming signals from swiping of a card with a magnetic stripe through a miniaturized portable card reader.

In the example of FIG. 14, the flowchart 1400 starts at block 1402 where decoding engine 110 initializes its internal state by waiting for the system voltage to reach a steady state. Upon initial connection of a card reader, there is usually a burst of signal due to feedback caused by slight impedance mismatches and the presence of non-linear elements like the read head. After at least 3 time constants, the signal is determined to be in a steady state. During such initialization phase, the DC offset of the incoming signals are computed when the mobile device is first connected to the card reader over signal plug 18. In some embodiments, initialization goes through at least the following steps:

Take one system buffer of audio signal and compute the DC offset of this buffer.

Save the computed DC offset.

Compute the average of the last three DC offsets.

Compute the variance of the current DC offset from the average computed in step 3.

The following values presented were found to be optimum for performance in the decoding system. In the spirit of full disclosure they have been provided here to allow someone trained in the arts to be able to replicate this process. It is fully realized that many other values can be used here and depending on hardware implementation. The values here are meant to be non-limiting. If the variance computed in step 4 is less than the variance threshold, 0.06% of full scale or less than the offset percentage, 10% of the offset average computed in step 3, and the DC offset computed in step 1 is less than the noise ceiling, 3% of full scale, of the mobile device 100. After initialization is complete, decoding engine 110 can proceed to process the incoming signals to detect the swipe of the card. Otherwise, Steps 1-4 need to be repeated.

The flowchart 1400 continues to block 1404 where decoding engine 110 detects the card swipe once the incoming signals are in a steady state. This signal detection phase processes the incoming signals in steady state in order to detect the presence of a swipe of a card through the card reader. The signal detection phase is a light-weight procedure that operates at near real time. It parses the incoming signals quickly and stitches multiple system buffers of signals together to form a signal of interest. In some embodiments, the signal detection process goes through at least the following steps:

Apply a software upscale of system buffers of the incoming signals.

Begin taking buffers of incoming signals and look for points that exceed a minimum signal amplitude threshold, which is a hardware-based parameterization found empirically.

Set a flag that triggers the detection of a swipe once a single point that exceeds the threshold is detected.

Once the flag triggered, the incoming signal is appended to a larger buffer until the signal drops below a minimum signal amplitude threshold for a certain period of time, e.g., 10 ms.

Trim the last 10 ms of data to reduce the amount of signal data to be processed later.

Check to see if at least a certain number of samples have been collected in the buffer to make sure that there are enough information for later decoding. This number is parameterized based on the hardware of the mobile device used.

Alternatively, a hardware independent swipe detection process can be utilized to capture the signal of interest via Fast Fourier Transform (FFT), while trimming the front and back of the signal. Such process would include at least the following steps:

Retrieve system buffers of incoming signals and keep a certain number of buffers of history of the signals.

Compute the frequency distribution of the signal history kept via FFT.

Locate two maxima in the histogram and check if one maximum is located at 2× the frequency of the other maximum. If this condition is satisfied, continue to add on buffers of history that exhibit such behavior.

Once such behavior has stopped, begin removing signals from the beginning and ending of the signals in the buffers until SNR is maximized, wherein SNR is defined to be the two maxima's amplitudes that are greatest from the next maximum.

The flowchart 1400 continues to block 1406 once a card swipe is detected to be present where decoding engine 110 identifies peaks in the incoming signals. Peak detection is the most complex portion of decoding of incoming signals from credit card swipes, and credit card swipe decodes have traditionally not been done on heavily filtered signals like the signal that enters through the TRS plug, since most mobile device manufacturers assume the incoming signal is audio based. This results in a wide variety of signal filtering that peak detection must account for. Different peak detection approaches discussed below can be utilized by the microprocessor to perform peak detection in the incoming signals in different ways, all applying a basic, moving average low-pass filter to smooth out some of the high frequency noise in order to overcome the low quality data read, sampling speed limitations of the mobile device, and the noise introduced into the mobile device.

Reactive Peak Detection

Reactive peak detection is a heuristics based approach for peak detection, which is well suited for situations where the incoming signals from the card swipe is not excessively distorted by the mobile device's filter circuitry. This approach utilizes at least the following steps to detect signal peaks:

Seed an adaptive positive and adaptive negative threshold with an ambient noise value that is dependent on the hardware of the mobile device. These thresholds will be used for initial peak detection.

Begin processing through the sample buffer, and for each sample in the buffer:

Wait for the threshold to be crossed again when either the negative or positive threshold is crossed, except with a hysteresis factor applied to the threshold for the second crossing. The hysteresis factor is key in making this approach resistant to ringing in the incoming signals, which is associated with the active filter(s) of the platform hardware.

Begin looking for slope changes within this time frame once the two samples where the threshold is crossed have been established.

If more than one slope change is found, compute the midpoint of the two samples.

If only a single slope change is detected, then

Pick the maximum point for the slope change.

Compare the peak's amplitude to the previously found peak's amplitude (if this has been established).

Skip the current peak and move on if its amplitude is greater than ((([full scale]-[current peak amplitude])/([full scale]*100)+100) % of the previous peak's amplitude.

If the prior step did not result in skipping of the peak, check the peak's polarity against the previous peak's polarity.

If the peak's polarity is the same as the previous peak's polarity, then remove the previous peak and put the current peak in its place.

If the polarity of the current peak has changed, then simply add the current peak to the list of peaks. This step is another key component for making this approach resistant to ringing.

Upon the finding of a peak, update the adaptive threshold of the corresponding polarity as the polarity of the peak just found and the amplitude to be a percentage of this peak's amplitude. Here, the percentage is a parameter varied by the detection approach being used, since higher values more accurately detects peaks, but are not as resistant to noise, while lower values are more resistant to noise, but may pick up errant peaks associated with ringing.

Predictive Peak Detection

Predictive peak detection defers the heavy processing to the digitizing stage of decoding. Predictive peak detection is highly resistant to scratches in the card that could cause low quality or false peak information to manifest in the incoming signals. This approach is more memory intensive than the reactive peak detection approach since more peaks are stored. The approach utilizes at least the following steps to detect signal peaks:

Seed a positive and adaptive negative threshold with an ambient noise value that is dependent on the hardware of the mobile device.

Begin going through the sample buffer. For each sample in the buffer:

Begin waiting for the slope to change when either the positive or negative threshold is crossed.

When the slope changes, store the current sample as a peak.

Maxima Peak Detection

Maxima peak detection detects peaks by looking for local maxima and minima within a window of digital samples. If either of these is at the edges of the window of samples, then the approach skips the window and moves to the next window to look for local maxima and minima. These local maxima and minima are then stored into a list of peaks.

The flowchart 1400 continues to block 1408 where decoding engine 110 identifies the track from which data of the incoming signals are read through the swipe of the card via the card reader. Traditionally, track 1 and track 2 came off of different pins on the read head of a card reader, and so there was no need to guess which track is being read. Since read head 16 in card reader is capable of reading only one track of data from the magnetic stripe, track identification becomes an important issue. This track identification process is run by detection engine 110 after peaks are detected to guess and recognize the track (track 1 or track 2) from which the data is read by card reader by inferring a range of peaks to be expected for signals coming from each track. Since track 1 is known to be much denser in data than track 2, it is thus reasonable to expect more peaks to be identified in data coming from track 1. Although this process is not a definitive guess, it yields the correct track value 99.9% when coupled with the peak detection algorithms described herein in testing. Alternatively, track guessing can be based on the number of bits found in the digital signals after the digitizing stage of decoding. When a decoder fails due to guessing the wrong track (since track identification affects how the bits from the digital signals are framed and matched against character sets), the decoder may simply choose another track type, though this makes the card processing more processor intensive.

The flowchart 1400 continues to block 1410 where decoding engine 110 digitizes the identified peaks in the incoming signals into bits. The digitizing process takes the given peak information turns them into binary data and appends them to an array of digital bits. There are two types of digitizers: reactive digitizing and predictive digitizing.

Reactive Digitizing

Reactive digitizing takes the given peak information as fact, and attempts to convert them into 1 s and 0 s in the following steps:

Go through all peak information. For each peak:

Identify the distance between each pair of adjacent peaks.

If these distances are similar (e.g., based on a parameter for finding a series of peaks that are equidistant from each other), begin looking for 1 s and 0 s. The initial peaks always represent zeros, since the credit card is padded with zeros at the front and back of the signal.

Once equidistant peaks are found, identify the number of samples between peaks, which is the number of samples that roughly equate to a bit.

Examine the number of samples between the current peak and the next peak.

Examine the number of samples between the current peak and the peak after the next.

Compare the results from Steps 5 and 6 against the value from Step 4:

If the result from Step 5 is closer to the value from Step 4, then identify the bit found as a 0.

If the result from Step 6 is closer, then identify the bit found as a 1.

Tie breaking: if the distances are equal and the next two peak amplitudes are smaller than the current peak amplitude, then identify the bit found as a 1. Otherwise, identify the bit found as a 0.

Once the peak is determined, update the bit length based on the peak found: if the peak found was a 0, update with the value of Step 5; otherwise, use the value of step 6.

Predictive Digitizing

Predictive digitizing of detected peaks in the incoming signals does not treat the list of peaks as facts. It first finds bit length, and then seeks to a point in the peak list where the next relevant peak should be. Once it reaches this location, it then searches before and after the location for the nearest peak. The process then checks the polarity of this peak compared to the previous peak examined. If the polarities are the same, the bit found is identified as a 1. Otherwise, it is identified as a 0. This method of digitizing a peak list is effective in that it simply ignores any information that is likely irrelevant.

The flowchart 1400 ends at block 1412 where decoding engine 110 converts the array of digitized bits into words of card information. This converting process locates the bit sequence that is the start sentinel in the array. At that point, it takes frames of bits (e.g., 5 bits for track 2, 7 bits for track 1) and decodes them based on a symbol table. Along the way, the process constantly checks for parity and the LRC at the end to ensure the data is correct. If there are any errors in parity, LRC, or track length, blocks 1406-1412 may be repeated with a different set of parameters to get the correct signal data.

When a card swipe begins, decoding engine 110 can combine various peak detectors and digitizers discussed above in order to cover various ranges of degradation in quality of the analog input signal generated by card reader 10. In some embodiments, different process combinations and parameters can be chosen and optimized depending on the hardware platform of the mobile device. These combinations and parameter values can be pre-determined based on experimentation and testing and initialized upon starting of the decoding process. The decoding then runs through all processes specified and runs certain specific processes multiple times in order to get the correct signal. Such decoding process allows automatic scaling and adjustment during each run to account for different amounts of noise, sampling speed variations, signal ringing, and swipe direction.

Card Present Transaction without Information Sharing

In the example of FIG. 1, user interaction engine 120 is a software application running on mobile device 100 associated with a payee (merchant) that enables the payer (buyer)

and the merchant to interact with transaction engine 130 to complete a financial transaction. More specifically, it may take input of information related to the financial transaction from the buyer and/or the merchant, provide such input to transaction engine to initiate and complete the transaction, and present the result of the transaction to the buyer and the merchant. Here, the input of information accepted by user interaction engine 120 may include but is not limited to one or more of: amount of the transaction, including list price and optionally tips, additional notes related to the transaction such as written description and/or pictures of the item to be purchased, authorization and/or signature of the buyer.

In some embodiments, other than the conventional keyboard, user interaction engine 120 may utilize a touch screen of mobile device 100 to enable the buyer and the merchant to input numbers, characters, and signatures by touching the screen via a stylus or a finger.

In some embodiments, in addition to the result of the transaction, user interaction engine 120 may also present products or services provided by the merchant to the buyer in combination of one or more of text, pictures, audio, and videos, and enable the buyer to browse through the products and services on the mobile device to choose the one he/she intended to purchase. Such product information can be stored and managed in product database 150.

In the example of FIG. 1, transaction engine 130 takes as its input the decoded credit card information from decoding engine 110 and transaction amount from user interaction engine 120. Transaction engine 130 then contacts third party financial institutions such as an acquiring bank that handles such authorization request, which may then communicate with the card issuing bank to either authorize or deny the transaction. If the third party authorizes the transaction, then transaction engine 130 will transfer the amount of money deducted from the account of the card holder (e.g., the buyer) to an account of the merchant and provide the transaction results to user interaction engine 120 for presentation to the buyer and the merchant. In this manner, the merchant may accept a payment from the buyer via card reader 10 and mobile device 100.

In the example of FIG. 1, although mobile device 100 is associated with the merchant, transaction engine 130 running on mobile device 100 protects the privacy of the buyer/payer during the card-present transaction by taking card information from the buyer directly from decoding engine 110 and do not share such information with the merchant via user interaction engine 120. Here, the card information that are not shared with the merchant includes but is not limited to, card number, card holder's name, expiration date, security code, etc. In essence, transaction engine 130 serves as an intermediary between the buyer and the merchant, so that the buyer does not have to share his/her card information with the merchant as in a typical card-present transaction or an online transaction. Still, the buyer is able obtain an itemized receipt for the transaction completed as discussed later.

In some embodiments, although transaction engine 130 does not share card information of the buyer to the merchant, it may present identity information of the buyer, such as a picture of the buyer on record in user database 140, with the merchant via user interaction engine 120 so that merchant can reliably confirm the identity of the buyer during the card-present transaction to prevent credit fraud.

In the example of FIG. 1, user database 140, product database 150, and transaction database 160 can be used to store information of buyer and the merchant, products and services provided by the merchant, and transactions performed, respectively. Here, user information (e.g., name, telephone number, e-mail, etc.) can be obtained through online user registration and product information can be provided by the merchant, while transaction database 160 is updated every time a transaction is processed by the transaction engine 130. Information stored can be selectively accessed and provided to the buyer and/or merchant as necessary.

In the example of FIG. 1, transaction engine 130 communicates and interacts with the third party financial institution, user database 140, product database 150, and transaction database 160 over a network (not shown). Here, the network can be a communication network based on certain communication protocols, such as TCP/IP protocol. Such network can be but is not limited to, internet, intranet, wide area network (WAN), local area network (LAN), wireless network, Bluetooth, WiFi, and mobile communication network. The physical connections of the network and the communication protocols are well known to those of skill in the art.

Dynamic Receipt

In various embodiments, upon the completion of a financial transaction through, for a non-limiting example, card reader 10 connected to mobile device 100 associated with a merchant, transaction engine 130 running on the mobile device 100 can be configured to capture additional data associated with the transaction and incorporate the additional data into a dynamic receipt for the transaction, wherein in addition to transaction information typically included in a conventional receipt, the dynamic receipt may also include additional environmental information of the transaction. For non-limiting examples, the financial transaction can be an electronic transaction conducted over the Internet or a card present point-of-sale transaction where the buyer/payer makes the purchase at a store front, other "brick-and-mortar" location, or simply in presence of a merchant/payee.

In some embodiments, the additional environmental information included in the dynamic receipt may include information pertaining to the transaction environment. In one non-limiting example, a mobile device equipped with a Global Positioning System (GPS) receiver can be used to capture the coordinates/location of the transaction, and record it as a part of the information on the dynamic receipt. This way, the physical location of the point of sale (which may be different from the merchant/payee's registered address) can be recorded and used by transaction engine 120 to verify the transaction. In another non-limiting example, a mobile device equipped with a camera and/or audio and/or video recorder can be used to capture a photo and/or a video and/or an audio recording of the product or service involved in the transaction and incorporate such data or link/reference to such data into the dynamic receipt. In another non-limiting example, a mobile device with a biometric scanner can be used to scan the fingerprint or palm print of the buyer/payer and/or merchant/payee and includes at least a portion of such information in the dynamic receipt. In another non-limiting example, the mobile device can record certain information associated with the transaction in the dynamic receipt, wherein such information includes but is not limited to, how quickly the buyer swipes the card, the angle at which the card is swiped. In another non-limiting example, special characteristics of the card being swiped, also referred to as the magnetic fingerprint of the card, can be recorded and included in the dynamic receipt.

In some embodiments, the dynamic receipt can be in electronic form that can be accessed electronically or online and may also include link or reference pointing to multimedia information such as image, video or audio that are relevant to the transaction.

In some embodiments, transaction engine 130 can use the environmental information included in the dynamic receipt to assess risk associated with a transaction. For a non-limiting example, if the GPS information indicates that the transaction is taking place in a high crime/high risk area, the risk associated with the transaction is adjusted accordingly, and the buyer's bank may be notified accordingly. Alternatively, biometric information scanned and included in the dynamic receipt can be used for identity verification purposes to prevent identity theft and credit fraud.

In some embodiments, transaction engine 130 can use the dynamic receipt can be used as a non-intrusive way to communicate with the buyer and/or the merchant. For a non-limiting example, the additional information included in the dynamic receipt can be used to make offers to the buyer. If a dynamic receipt includes the GPS location of the point of sale of the transaction, coupons or other promotional offers made by vendors at nearby locations can be presented to the buyer when the buyer chooses to view the receipt electronically online. Alternatively, if a specific product involved the transaction can be identified by the transaction engine either directly through product description or indirectly by analyzing pictures or videos taken, offers of similar or complementary products can be made by a vendor to the merchant of the product.

In some embodiments, transaction engine 130 may notify buyer and/or the merchant of the receipt via an electronic message, which can be but is not limited to, an email message, a Short Message Service (SMS) message, Twitter, or other forms of electronic communication. The recipient of the electronic message may then retrieve a complete itemized dynamic receipt online at his/her convenience via a telephone number on his/her record in user database 140 to retrieve his/her electronic receipts stored in transaction database 160. In some embodiments, the electronic message may include an indication such as a code that the recipient can use to retrieve the electronic receipt online as an alternative or in combination with the telephone number.

Figure 15:
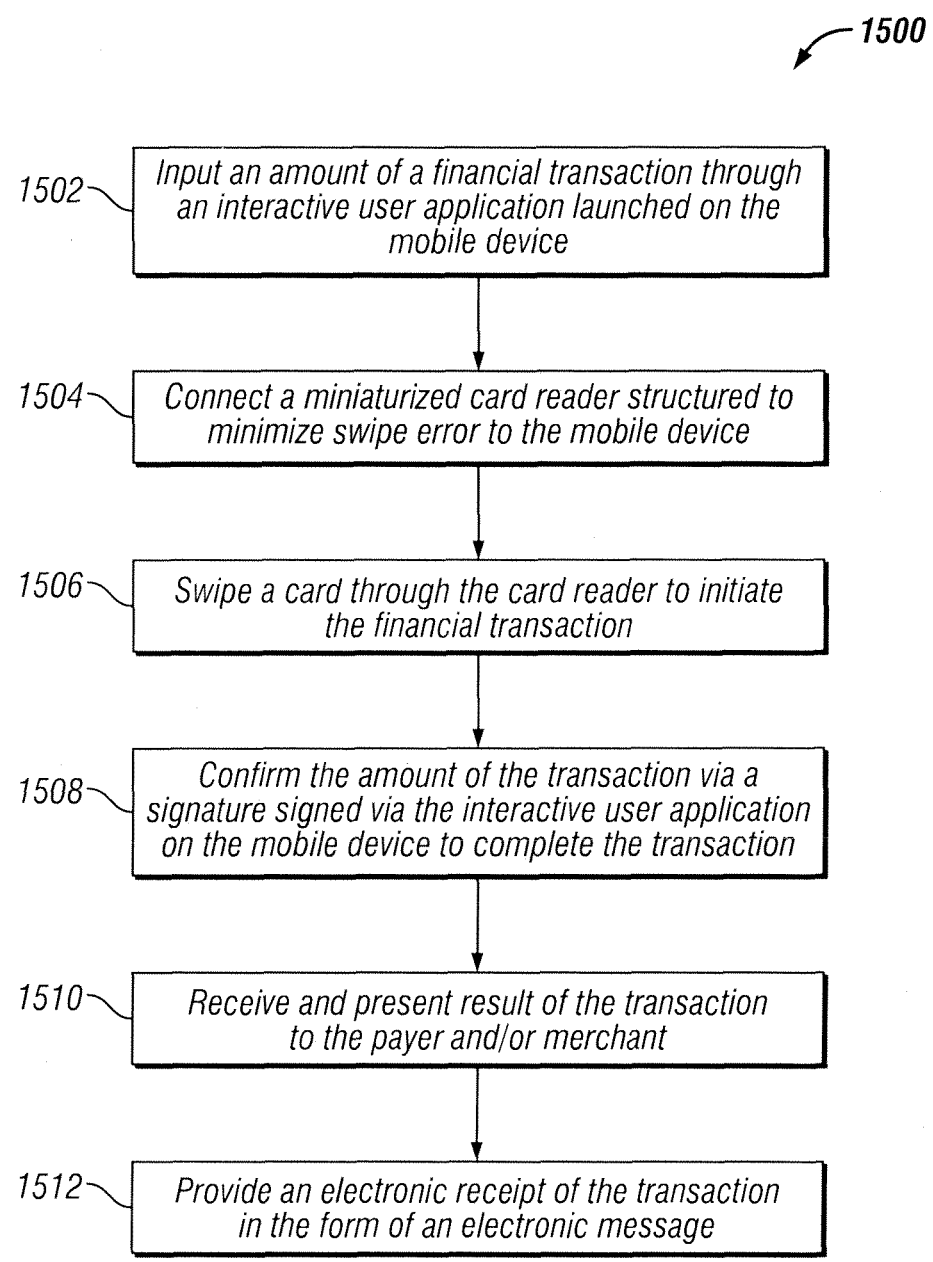
FIG. 15 depicts a flowchart of an example of a process to support financial transaction between a payer and a payee through a miniaturized card reader connected to a mobile device.
Figure 16A:
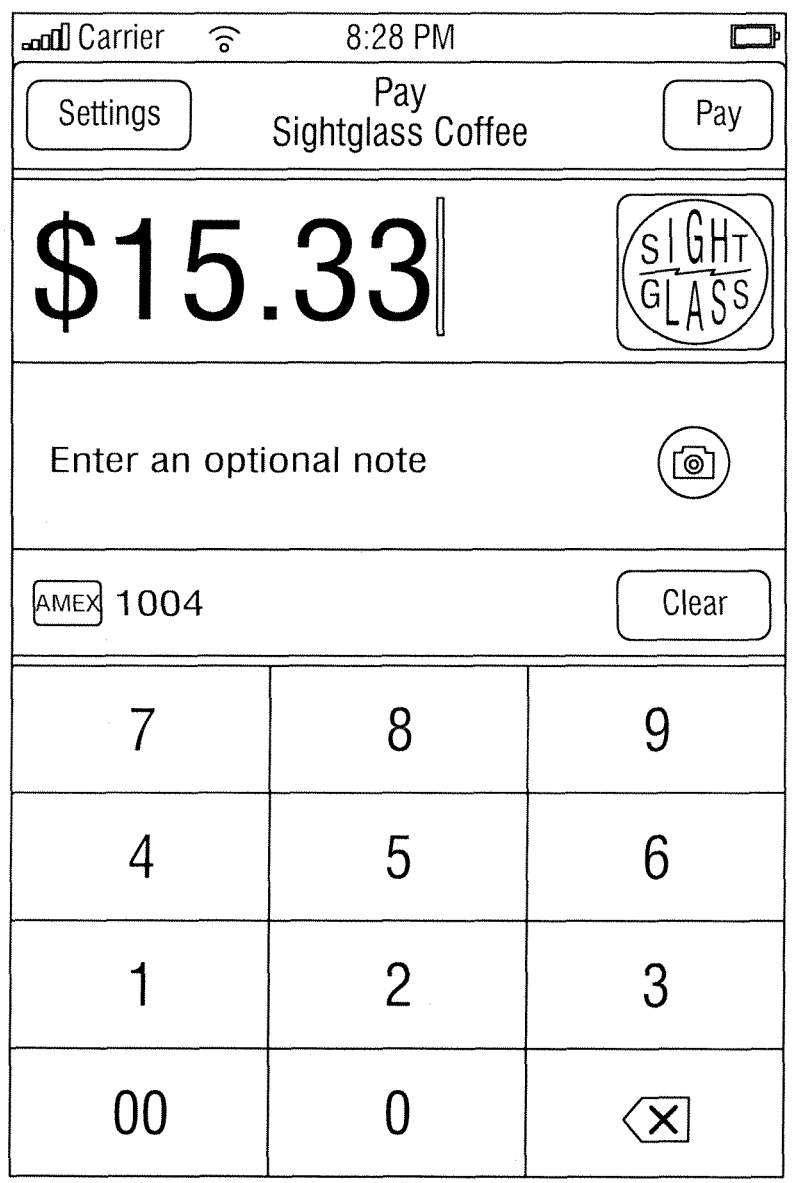
FIGS. 16(*a*)-(*f*) depict screenshots of an example of a financial transaction between a purchaser and a merchant through a miniaturized card reader connected to a mobile device.
Figure 16B:
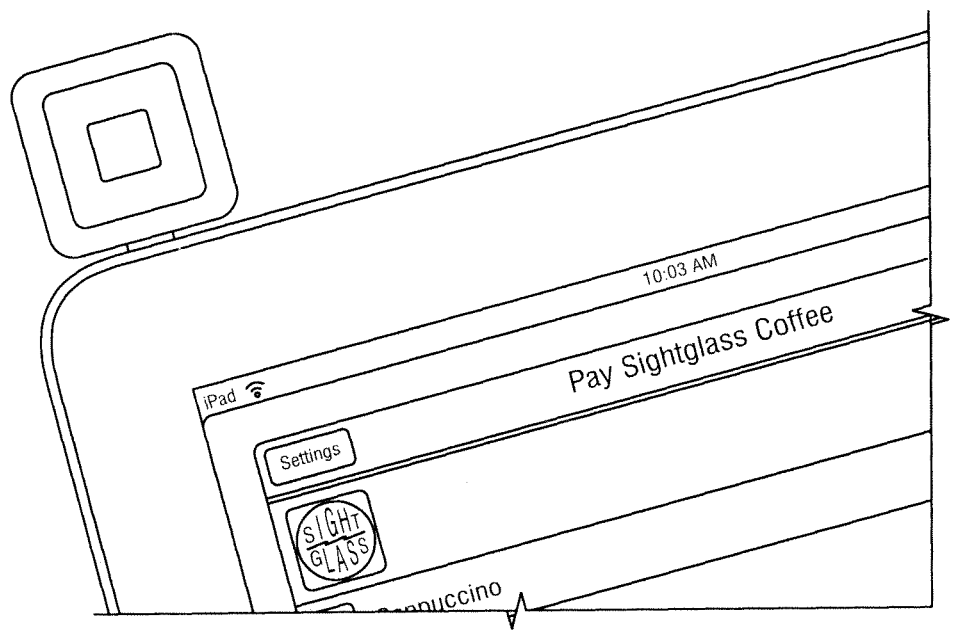
Figure 16C:
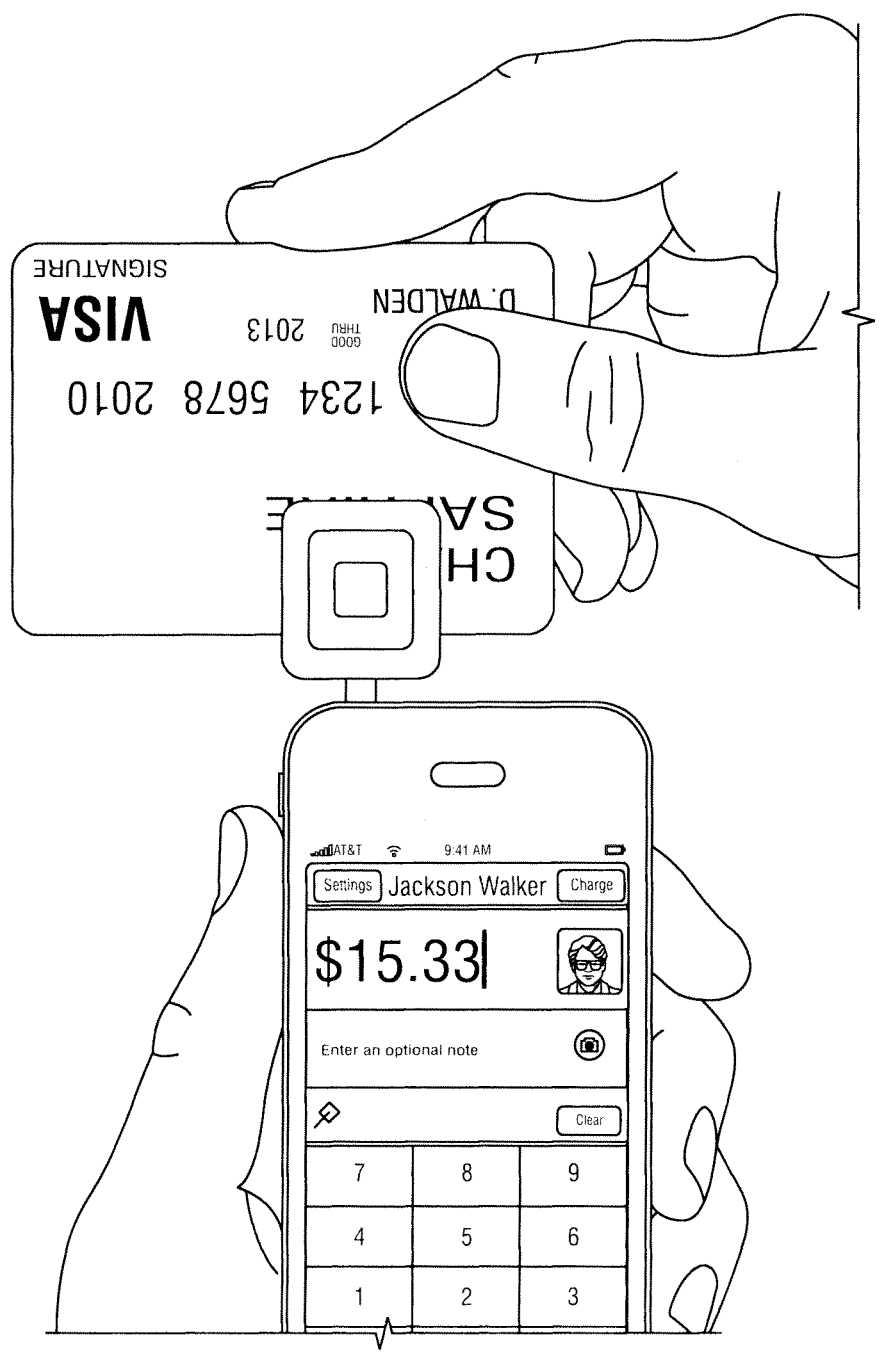
Figure 16D:
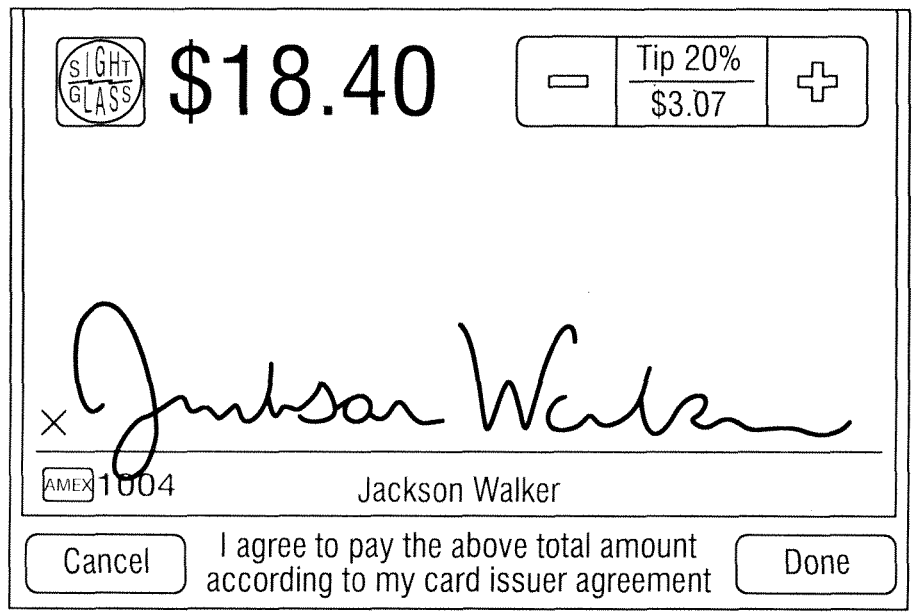
Figure 16F:
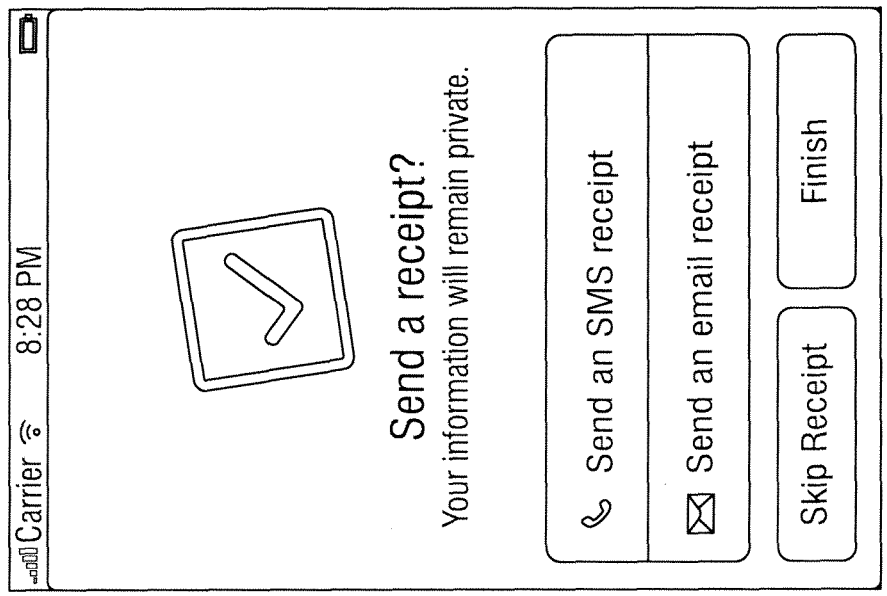
Figure 16E:
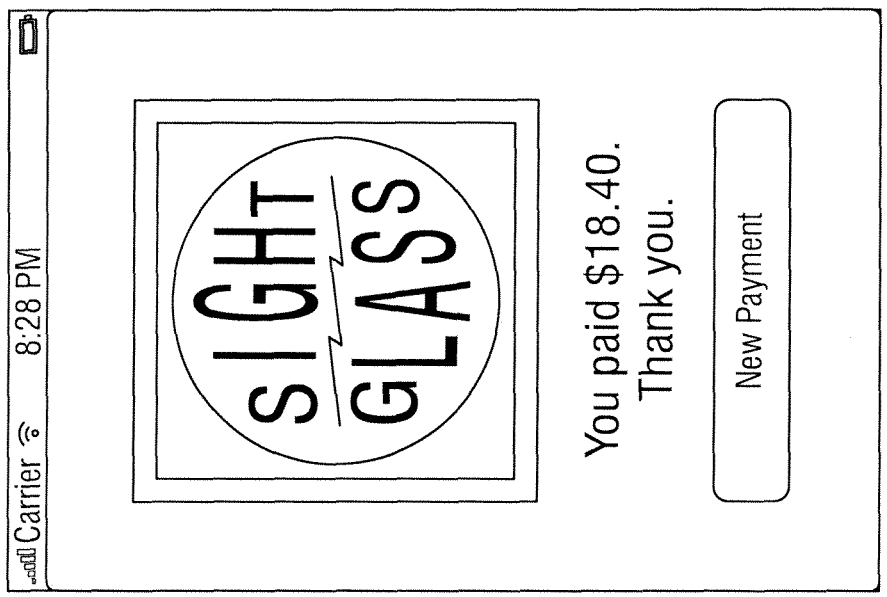

FIG. 15 depicts a flowchart of an example of a process to support financial transaction between a payer and a payee through a miniaturized card reader connected to a mobile device. In the example of FIG. 15, the flowchart 1500 starts at block 1502 where an amount of a financial transaction is provided through an interactive user application launched on the mobile device as shown in FIG. 16(a). The flowchart 1500 continues to block 1504 where a miniaturized card reader structured to minimize swipe error is connected to the mobile device as shown in FIG. 16(b). The flowchart 1500 continues to block 1506 where a card is swiped through the card reader to initiate the financial transaction as shown in FIG. 16(c). The flowchart 1500 continues to block 1508 where the payer confirms the amount of the card-present transaction via a signature signed via the interactive user application on the mobile device to complete the transaction as shown in FIG. 16(d). Note that the signature is required as an additional layer of confirmation for the protection for the payer even when such signature may not be technically required to authorize the transaction. The flowchart 1500 continues to block 1510 where result of the transaction is received and presented to the payer and/or merchant as shown in FIG. 16(e). The flowchart 1500 ends at block 1512 where an electronic receipt of the transaction is provided to the payer in the form of an electronic message as shown in FIG. 16(f).

In one embodiment, a longitudinal plane of the of the output jack 18 lies within the plane that the card travels in the slot 14 within 5 mm, and in another embodiment within 3 mm.

Figure 17:
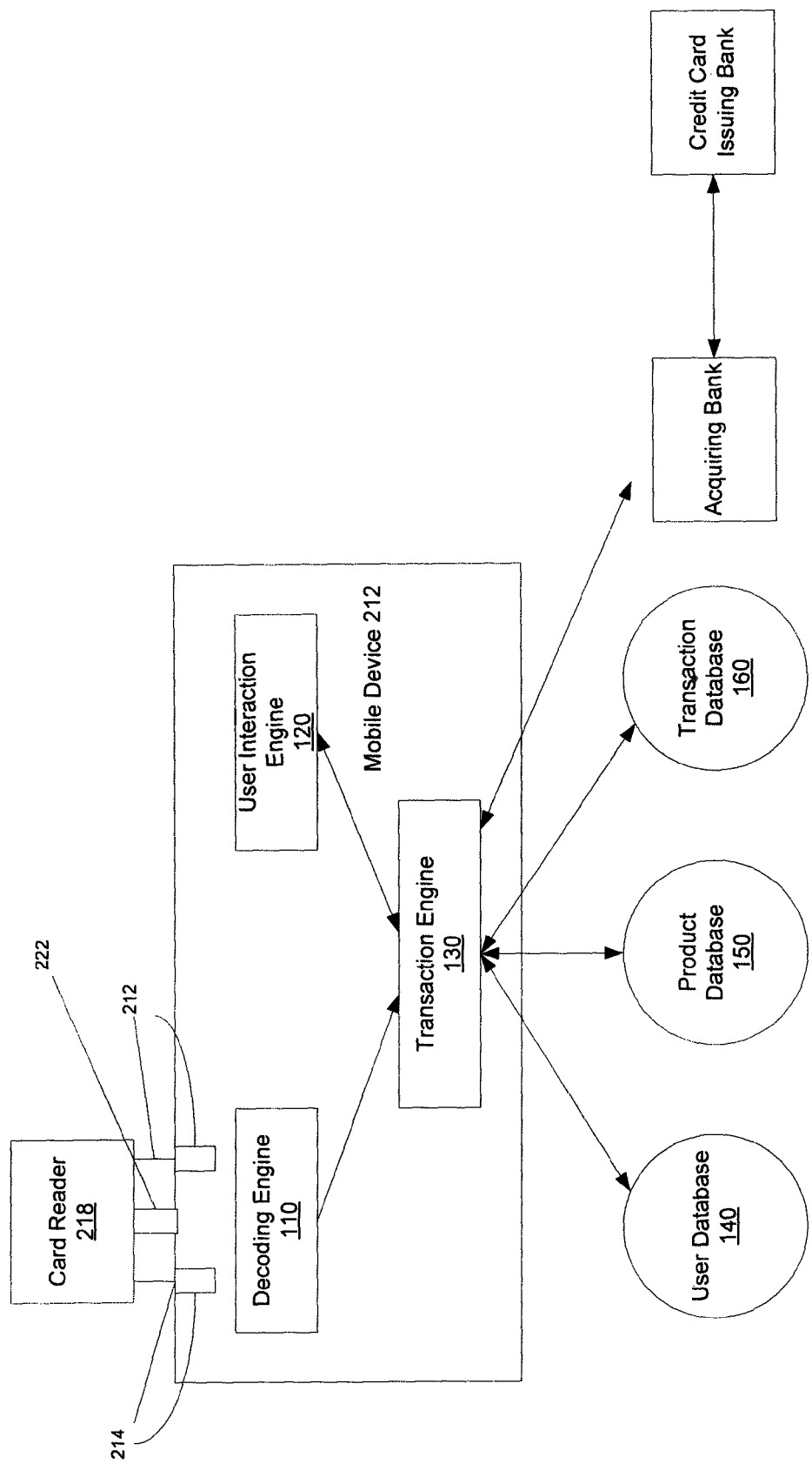
FIG. 17 illustrates an integrated read head/mobile device embodiment of the present invention.

Referring now to FIG. 17, in one embodiment of the present invention an integrated read head system includes mobile device 212 with an audio jack 214 at least one microphone input port 216. A read head 218 is physically coupled to the mobile device 212. The read head 218 has a slot 220 for swiping a magnetic stripe of a financial transaction card to enable a financial transaction between a buyer and seller. The read head 218 reads data on the magnetic stripe and produces a signal indicative of data stored on the magnetic stripe. The read head 218 has an output jack 222 that physically connects the read head 218 to at least one of the audio jack 214 or microphone port 216 of the mobile device 212. The read head 218 provides the signal to the mobile device 212. The signal is decoded at the mobile device 212. The decoding includes determining pulses in the signal and converts at least some of the pulses to characters.

In another embodiment of the present invention, a method is provided for conducting a financial transaction with a financial transaction card using the integrated read head system 210.

The foregoing description of various embodiments of the claimed subject matter has been provided for the purposes of illustration and description. It is not intended to be exhaustive or to limit the claimed subject matter to the precise forms disclosed. Many modifications and variations will be apparent to the practitioner skilled in the art. Particularly, while the concept "component" is used in the embodiments of the systems and methods described above, it will be evident that such concept can be interchangeably used with equivalent concepts such as, class, method, type, interface, module, object model, and other suitable concepts. Embodiments were chosen and described in order to best describe the principles of the invention and its practical application, thereby enabling others skilled in the relevant art to understand the claimed subject matter, the various embodiments and with various modifications that are suited to the particular use contemplated.

What is claimed is:

1. A card reader system, comprising:
   a housing having a slot for swiping a magnetic stripe of a financial transaction card to complete a financial transaction between a buyer and seller;
   a read head in the housing for reading data stored on the magnetic stripe and for producing a signal indicative of data stored on the magnetic stripe;
   an output jack adapted to be coupled to at least one of an audio jack or microphone input port of a mobile device for providing, to the mobile device, the signal indicative of data stored on the magnetic stripe;
   a card reader circuit with a control unit, the control unit being coupled to a pathway subsystem that is configured to direct bias voltage received from the mobile device to a card reader power subsystem, the card reader power subsystem including a modified charge pump and being configured to convert the bias voltage to a system voltage that is usable by the control unit, wherein the control unit configures the pathway subsystem to allow the card reader circuit to access the mobile device; and
   an encryption system in communication with a communication system and the control unit, wherein the control unit, in operation, provides for communication of encrypted information from the encryption system.

2. The card reader system of claim 1, wherein the output jack has a length extending from the card reader in a range of 2-5 mm.

3. The card reader system of claim 1, wherein the output jack has a diameter of no greater than 3.5 mm and a base of the output jack is no more than 5 mm.

4. The card reader system of claim 1, wherein a longitudinal plane of the output jack lies within the plane that the financial transaction card travels in the slot within 3 mm.

5. The card reader system of claim 1, wherein a confirmation of payment is made to the buyer in response to completion of the financial transaction.

6. The card reader system of claim 1, further comprising: determining that the buyer is present with the seller at the time of the financial transaction.

7. The card reader system of claim 1, wherein the financial transaction card is selected from at least one of: a credit financial transaction card, debit financial transaction card, gift financial transaction card, and fund transfer financial transaction card.

8. The card reader system of claim 1, wherein the mobile device is a portable electronic device that includes at least one of: software, firmware, hardware, or a combination thereof, that is capable of at least receiving a signal, decoding the signal if required, exchange information with a third party financial institution or payment network to verify a buyer and/or seller's account information and conduct the transaction.

9. The card reader system of claim 1, wherein the mobile device is a mobile digital device.

10. The card reader system of claim 1, wherein the financial transaction is an electronic transaction conducted over the Internet or a financial transaction card present point-of sale transaction where the buyer makes the purchase at a store front, other "brick-and-mortar" location, or in a presence of the seller.

11. The card reader system of claim 1, wherein the signal includes financial transaction data selected from at least one of: an amount of the transaction, additional notes related to the transaction, authorization and/or signature of the buyer.

12. The card reader system of claim 1, wherein the signal includes financial transaction card information selected from at least one of: one or more of financial transaction card number, financial transaction card holder's name, expiration date, and security code.

13. The card reader system of claim 1, wherein the slot is configured to reduce torque applied on the card reader when the financial transaction card is swiped through the slot in order to maintain accuracy and reliability of the data read by the card reader.

14. The card reader system of claim 1, wherein the signal produced is indicative of data stored on the magnetic stripe with minimum error via a single swipe of the financial transaction card.

15. The card reader system of claim 1, wherein acceptance and initialization of incoming signals from a swipe of the financial transaction card are done until the signals reach a steady state, the financial transaction card swipe is detected once steady state is reached, or peaks in the incoming signals are identified when the financial transaction card swipe is detected.

16. The card reader system of claim 1, wherein the financial transactions is completed without sharing financial transaction card information with the seller.

17. A card reader system, comprising:
a housing having a slot for swiping a magnetic stripe of a financial transaction card to complete a financial transaction between a buyer and a seller;
a read head in the housing for reading data stored on the magnetic stripe and for producing a signal indicative of data stored on the magnetic stripe;
an output jack adapted to be coupled to at least one of an audio jack or microphone input port of a mobile device for providing, to the mobile device, the signal indicative of data stored on the magnetic stripe;
the output jack having a length, extending from the housing, of at least 2 mm;
a card reader circuit with a control unit, the control unit being coupled to a pathway subsystem that is configured to direct bias voltage received from the mobile device to a card reader power subsystem, the card reader power subsystem including a modified charge pump and being configured to convert the bias voltage to a system voltage that is usable by the control unit, wherein the control unit configures the pathway subsystem to allow the card reader circuit to access the mobile device; and
an encryption system in communication with a communication system and the control unit, wherein the control unit, in operation, provides for communication of encrypted information from the encryption system.

18. A method for conducting a financial transaction with a financial transaction card, comprising:
coupling a card reader to a mobile device;
swiping the financial transaction card through a slot in the card reader;
producing a signal indicative of data stored on a magnetic stripe of the financial transaction card with at least a portion of the signal including encrypted information;
converting, using a card reader power subsystem including a modified charge pump, voltage received from the mobile device to a card reader system voltage that is usable by the card reader;
configuring the card reader to access the mobile device;
encrypting at least a portion of the signal at the card reader;
sending the signal to an engine of the mobile device that is coupled to the card reader; and
receive, by operation of the engine, an input to the mobile device of at least one of an input number, character and one or more signatures.

19. The method of claim 18, further comprising:
communicating at least a portion of an information with a third party financial institution or payment network to authorize the financial transaction.

20. The method of claim 18, further comprising:
sending confirmation of payment to a buyer in response to completion of the financial transaction.

21. The method of claim 18, further comprising:
confirming that a buyer is authorized to use the financial transaction card.

22. The method of claim 18, further comprising:
determining that a buyer is present with a seller at the time of the financial transaction.

23. The method of claim 18, further comprising:
payment is made with a communication channel of a buyer's choice.

24. The method of claim 18, further comprising:
confirming payment with an electronic notification in the form selected from at least one of an, email, SMS message, tweet (message delivered via online social networking service), instant message or communication within a social network.

25. The method of claim 18, wherein the mobile device is a seller's mobile device.

26. The method of claim 25, wherein the financial transaction is an electronic transaction conducted over the Internet or a financial transaction card present point-of-sale transaction where a buyer makes a purchase at a store front, other "brick-and-mortar" location, or in presence of a seller.

27. The method of claim 18, wherein the financial transaction card is selected from at least one of: a credit financial transaction card, debit financial transaction card, gift financial transaction card, and fund transfer financial transaction card.

28. The method of claim 18, wherein the mobile device is a portable electronic device that includes at least one of: software, firmware, hardware, or a combination thereof, that is capable of at least receiving a signal, decoding the signal if required, exchange information with a third party financial institution or payment network to verify a buyer and/or seller's account information and conduct the transaction.

29. The method of claim 18, wherein the mobile device is a mobile digital device.

30. The method of claim 18, wherein financial transaction information includes data selected from at least one of: an amount of the transaction, additional notes related to the transaction, authorization and/or signature of a buyer.

31. The method of claim 18, wherein the financial transaction card information includes one or more of financial transaction card number, financial transaction card holder's name, expiration date, and security code.

32. The method of claim 18, further comprising:
coupling the housing and the card reader with the output jack.

* * * * *